United States Patent
You et al.

(10) Patent No.: US 11,122,523 B2
(45) Date of Patent: Sep. 14, 2021

(54) INFORMATION TRANSMISSION METHOD AND APPARATUS

(71) Applicant: HUAWEI TECHNOLOGIES CO., LTD., Guangdong (CN)

(72) Inventors: Chunhua You, Shanghai (CN); Xing Liu, Shenzhen (CN); Qufang Huang, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 39 days.

(21) Appl. No.: 16/578,994

(22) Filed: Sep. 23, 2019

(65) Prior Publication Data
US 2020/0022094 A1    Jan. 16, 2020

Related U.S. Application Data

(63) Continuation of application No. PCT/CN2018/080340, filed on Mar. 23, 2018.

(30) Foreign Application Priority Data

Mar. 24, 2017    (CN) .......................... 201710184876.X

(51) Int. Cl.
*H04W 4/00*        (2018.01)
*H04W 52/36*       (2009.01)
(Continued)

(52) U.S. Cl.
CPC ..... *H04W 52/365* (2013.01); *H04W 28/0278* (2013.01); *H04W 52/242* (2013.01);
(Continued)

(58) Field of Classification Search
CPC ............... H04W 52/365; H04W 76/27; H04W 28/0278; H04W 52/242; H04W 72/0413; H04W 72/044
See application file for complete search history.

(56) References Cited

U.S. PATENT DOCUMENTS 9,072,064 B2 *    6/2015    Zhang .................... H04W 72/04
9,585,107 B2 *    2/2017    Xu ........................ H04W 52/242
(Continued)

FOREIGN PATENT DOCUMENTS

CN    101895923 A    11/2010
CN    102577488 A    7/2012
(Continued)

OTHER PUBLICATIONS

Huawei et al:"Consideration on Phr triggering and cancellation in NR", 3GPP Draft; R2-1709268, vol. RAN WG2, no .Berlin, Germany; Aug. 21, 2017-Aug. 25, 2017, Aug. 20, 2017, XP051319032, 2 pages.
(Continued)

*Primary Examiner* — Abdelnabi O Musa
(74) *Attorney, Agent, or Firm* — Womble Bond Dickinson (US) LLP

(57) ABSTRACT

Embodiments of the present invention provide an information transmission method, including: when a terminal device is in a power headroom report (PHR) triggering state, receiving, by the terminal device, a first indication from a network device, where the first indication is used to indicate a first uplink transmission resource of the terminal device, and the uplink transmission resource is used by the terminal device to perform uplink transmission with the network device; and keeping, by the terminal device, the power headroom report triggering state in a first time period, and canceling the power headroom report triggering state when the first time period expires, where the first time period is a second time period starting from a receiving time point of the first indication to a time domain end of the first uplink transmission resource indicated by the first indication.

20 Claims, 9 Drawing Sheets

(51) Int. Cl.
   *H04W 76/27*     (2018.01)
   *H04W 28/02*     (2009.01)
   *H04W 52/24*     (2009.01)
   *H04W 72/04*     (2009.01)

(52) U.S. Cl.
   CPC ....... *H04W 72/0413* (2013.01); *H04W 76/27* (2018.02); *H04W 72/044* (2013.01)

(56) References Cited

U.S. PATENT DOCUMENTS

| | | | |
|---|---|---|---|
| 2010/0093364 A1 | 4/2010 | Ribeiro et al. | |
| 2011/0092217 A1* | 4/2011 | Kim | H04W 52/365 455/450 |
| 2013/0148619 A1* | 6/2013 | Ahn | H04W 72/0473 370/329 |
| 2015/0304968 A1* | 10/2015 | Kim | H04W 36/0016 370/329 |
| 2015/0358998 A1 | 12/2015 | Golitschek Edler Von Elbwart et al. | |
| 2016/0337087 A1 | 11/2016 | Chen et al. | |
| 2016/0374032 A1 | 12/2016 | Kim et al. | |
| 2017/0085345 A1 | 3/2017 | Dinan | |
| 2017/0359787 A1 | 12/2017 | Kim et al. | |
| 2018/0041975 A1* | 2/2018 | Yi | H04W 76/16 |

FOREIGN PATENT DOCUMENTS

| | | |
|---|---|---|
| CN | 104780600 A | 7/2015 |
| CN | 104937991 A | 9/2015 |

OTHER PUBLICATIONS

LG Electronics Inc., "Deadlock of PHR transmission", 3GPP Draft: R2-122460, vol. RAN WG2, no. Prague, Czech; May 21, 2012-May 25, 2012, May 14, 2012, XP050606948, 3 pages.

\* cited by examiner

INFORMATION TRANSMISSION METHOD AND APPARATUS

CROSS-REFERENCE TO RELATED APPLICATIONS

This application is a continuation of International Application No. PCT/CN2018/080340, filed on Mar. 23, 2018, which claims priority to Chinese Patent Application No. 201710184876.X, filed on Mar. 24, 2017. The disclosures of the aforementioned applications are hereby incorporated by reference in their entireties.

TECHNICAL FIELD

This application relates to the field of communications technologies, and in particular, to an information transmission method and apparatus.

BACKGROUND

A next-generation mobile communications system needs to support transmission of a plurality of types of services, such as a high-bandwidth service, a high-reliability service, a low-latency service, and small-sized traffic. A multi-numerology technology is proposed to support transmission of a plurality of types of services. A numerology is a parameter set including parameters such as a subcarrier spacing, a cyclic prefix (CP) length, and a transmission time interval (TTI) length. Different numerologies may be understood as being different in terms of at least one of the parameters included in the parameter set.

Due to occurrence of multi-numerology, a solution applicable to the multi-numerology technology is also required to report some parameters in wireless communication, such as a power headroom report (PHR) and/or a buffer status report (BSR).

SUMMARY

Embodiments of the present invention provide an information transmission method and apparatus, a network device, and a terminal device, so that some parameters can be reported in a multi-numerology scenario.

According to a first aspect, an embodiment of the present invention provides an information transmission method, including:

when a terminal device is in a power headroom report (PHR) triggering state, receiving, by the terminal device, a first indication from a network device, where the first indication is used to indicate a first uplink transmission resource of the terminal device, and the uplink transmission resource is used by the terminal device to perform uplink transmission with the network device; and keeping, by the terminal device, the power headroom report triggering state in a first time period, and canceling the power headroom report triggering state when the first time period expires, where the first time period is:

a second time period starting from a receiving time point of the first indication to a time domain end of the first uplink transmission resource indicated by the first indication; or a third time period starting from a receiving time point of the first indication to a time point of receiving a response signal sent by the network device to indicate that data sent on the first uplink transmission resource is successfully received; or a fourth time period starting from a receiving time point of the first indication to a time point of generating a power headroom report based on a second indication corresponding to a shortest transmission time interval after the second indication is received, where the second indication is used to indicate a second uplink transmission resource of the terminal device; or a fifth time period starting from a receiving time point of the first indication and having fifth duration, where the fifth duration is a default value or comes from the network device.

Alternatively, the method includes:

when a terminal device is in a buffer status report (BSR) triggering state, receiving, by the terminal device, a first indication from a network device, where the first indication is used to indicate a first uplink transmission resource of the terminal device, and the uplink transmission resource is used by the terminal device to perform uplink transmission with the network device; and keeping, by the terminal device, the BSR triggering state in a first time period, and canceling the BSR triggering state when the first time period expires, where the first time period is:

a second time period starting from a receiving time point of the first indication to a time domain end of the first uplink transmission resource indicated by the first indication; or a third time period starting from a receiving time point of the first indication to a time point of receiving a response signal sent by the network device to indicate that data sent on the first uplink transmission resource is successfully received; or a fourth time period starting from a receiving time point of the first indication to a time point of generating a BSR based on a second indication corresponding to a shortest transmission time interval after the second indication is received, where the second indication is used to indicate a second uplink transmission resource of the terminal device; or a fifth time period starting from a receiving time point of the first indication and having fifth duration, where the fifth duration is a default value or comes from the network device.

It may be understood that the first time period includes the receiving time point of the first indication that is used as a start.

It may be understood that, although same nouns such as the first indication, the first time period, the second time period, the third time period, the fourth time period, the fifth time period, and the second indication are used to describe solutions of the PHR and the BSR, this only indicates that definitions of the nouns are similar, and does not necessarily indicate that values of the nouns are the same.

It may be understood that the generation of the PHR may include generation of the PHR at a media access control (MAC) layer, for example, generation of a MAC control element (CE) including the PHR, and the generation of the PHR may include generation of the BSR at the MAC layer, for example, generation of a MAC CE including the BSR.

In the foregoing method, the PHR and/or BSR triggering state is not simply canceled when the MAC CE including the PHR and/or the BSR is generated, but a time point for canceling the PHR and/or BSR triggering state is improved, so that the PHR and/or BSR triggering state is more suitable for a multi-numerology and/or multi-beam scenario.

In one embodiment, the first time period includes the time point used as an end.

In one embodiment, the first time period does not include the time point used as an end.

In one embodiment, that the fifth duration comes from the network device may be specifically in a dynamic configuration manner, for example, the fifth duration is carried by using downlink control information; or may be in a semi-static configuration manner, for example, the fifth duration is carried by using radio resource control signaling.

In one embodiment, the second uplink transmission resource includes a second time domain resource, the first uplink transmission resource includes a first time domain resource, and the first time domain resource and the second time domain resource may partially overlap or are completely different.

In one embodiment, the PHR and/or the BSR may be included in a MAC CE, and the uplink transmission resource may include a time-frequency resource of the MAC CE, or may include a beam resource.

In one embodiment, the first indication may include one or more of the modulation and coding scheme, a hybrid automatic repeat request (HARM) process, an indication of whether the MAC CE is newly transmitted or retransmitted, a redundancy version of the MAC CE, and the like.

In one embodiment, the first indication used to indicate the first uplink transmission resource of the terminal device or the second indication is a message that carries uplink grant information. The message that carries the uplink grant information may be an uplink grant message.

In one embodiment, the first indication used to indicate the first uplink transmission resource of the terminal device or the second indication is carried in downlink control information.

In one embodiment, the first indication may be obtained through scrambling by using a cell temporary identifier.

In one embodiment, the first indication is related to a parameter set, and/or is related to a beam.

In one embodiment, the first indication and/or the second indication are/is an indication used for new transmission. The new transmission may also be referred to as initial transmission.

In one embodiment, the first time period includes at least one time unit, and the time unit may be at least one of a subframe (sub-frame), a symbol (symbol), a transmission time interval (TTI), or a slot (slot).

In one embodiment, the first indication is an indication that is first received by the terminal device after the terminal device enters the power headroom report triggering state and that corresponds to a relatively long transmission time interval and is used to indicate an uplink transmission resource of the terminal device.

In one embodiment, the first indication is an indication that is first received by the terminal device after the terminal device enters the buffer status report triggering state and that corresponds to a relatively long transmission time interval and is used to indicate an uplink transmission resource of the terminal device.

In one embodiment, the first uplink transmission resource has a first parameter set, where the parameter set includes a subcarrier spacing, a cyclic prefix length, and a transmission time interval, or the parameter set includes a subcarrier spacing and/or a cyclic prefix length, and the parameter set may further include a symbol length and/or a slot length, or the parameter set includes a subcarrier spacing and/or a cyclic prefix length; and/or the first uplink transmission resource includes a first uplink beam or a first uplink beam set, and the uplink beam set includes at least one uplink beam.

In one embodiment, the second uplink transmission resource has a second parameter set, and the second parameter set is different from the first parameter set in terms of at least one of three parameters included in the parameter sets: a subcarrier spacing, a cyclic prefix length, and a transmission time interval, or being different means that the parameter sets are different in at least one of two parameters included in the parameter sets: a subcarrier spacing and a cyclic prefix length, or being different means that the parameter sets are different in at least one of parameters included in the parameter sets; and/or the second uplink transmission resource includes a second uplink beam or a second uplink beam set, the uplink beam set includes at least one uplink beam, the second uplink beam is different from the first uplink beam, and the second uplink beam set is different from the first uplink beam set.

In one embodiment, the terminal device enters the power headroom report triggering state when a trigger condition is met, and the trigger condition includes any one of the following:

(1) a first timer expires or has expired, and a path loss change value of a reference activated serving cell is greater than a first threshold, where the first threshold is a default value or is configured by a radio resource control (RRC) layer, and the first timer is configured to prevent the terminal device from continuously triggering a PHR;

(2) a second timer expires, where the second timer is configured to periodically trigger a PHR, duration of the second timer is a default value or is configured by an RRC layer, and the second timer is configured for a media access control (MAC) entity;

(3) PHR function configuration or reconfiguration from an upper layer is received, and the configuration or reconfiguration is not used to disable a PHR function;

(4) a secondary serving cell (SCell) with configured uplink transmission is activated;

(5) a first timer expires or has expired, transmit power back-off occurs in uplink transmission of an activated serving cell, and a power back-off value exceeds a second threshold;

(6) a primary serving cell (PSCell) of a secondary eNodeB with dual connectivity is added;

(7) a first timer expires or has expired, and a path loss change of at least one reference serving downlink beam (beam) of a serving cell exceeds a third threshold, where the third threshold is a default value or is configured by the network device;

(8) at least one serving uplink beam of a serving cell is activated, configured, or added;

(9) a first timer expires or has expired, power back-off occurs on at least one serving uplink beam used as a reference, and a back-off value exceeds a fourth threshold;

(10) a third timer expires, where the third timer is configured to periodically trigger a PHR, and is configured for a beam, and duration of the third timer is a default value or is configured by the network device;

(11) a first timer expires or has expired, and a path loss change of at least one numerology used as a reference exceeds a fifth threshold, where the fifth threshold is a default value or is configured by the network device;

(12) at least one numerology of a serving cell is activated, added, or configured;

(13) a fourth timer expires, where the fourth timer is configured to periodically trigger a PHR, and is configured for a numerology, and duration of the fourth timer is a default value or is configured by the network device; or

(14) a first timer expires or has expired, power back-off occurs on at least one numerology used as a reference, and a back-off value exceeds a sixth threshold, where the sixth threshold is a default value or is configured by the network device.

The serving cell is a cell that establishes an RRC layer connection to the terminal device.

The power headroom report triggering state is a state in which the terminal device is allowed to generate a power headroom report.

In one embodiment, the method further includes: generating, by the terminal device, a power headroom report for an indication, in the first time period, of an uplink transmission resource indicated in an indication used to indicate the uplink transmission resource of the terminal device, where the indication used to indicate the uplink transmission resource of the terminal device includes the first indication.

In one embodiment, the terminal device may further generate, before the first time period expires, a power headroom report for an indication that is in the first time period and that is used to indicate the uplink transmission resource of the terminal device. After the first time period expires, if the terminal device has not generated a power headroom report for an indication that is in the first time period and that is used to indicate the uplink transmission resource of the terminal device, the terminal device does not generate the power headroom report for the indication any longer. In other words, the terminal device generates the power headroom report only when the terminal device is in the power headroom report triggering state.

In one embodiment, the method further includes: generating, by the terminal device, a buffer status report for an indication, in the first time period, of an uplink transmission resource indicated in an indication used to indicate the uplink transmission resource of the terminal device, where the indication used to indicate the uplink transmission resource of the terminal device includes the first indication.

In one embodiment, the terminal device may further generate, before the first time period expires, a buffer status report for an indication that is in the first time period and that is used to indicate the uplink transmission resource of the terminal device. After the first time period expires, if the terminal device has not generated a buffer status report for an indication that is in the first time period and that is used to indicate the uplink transmission resource of the terminal device, the terminal device does not generate the buffer status report for the indication any longer. In other words, the terminal device generates the buffer status report only when the terminal device is in the buffer status report triggering state.

In one embodiment, the method further includes: receiving, by the terminal device, a third indication from the network device, where the third indication is used to indicate whether an indication used to indicate the uplink transmission resource of the terminal device is used to trigger generation of a power headroom report, and an indication that is received by the terminal device and that is used to indicate the uplink transmission resource of the terminal device includes the first indication; and in the power headroom report triggering state, generating, by the terminal device according to the third indication, a power headroom report for an indication that is used to trigger generation of the power headroom report and that is used to indicate the uplink transmission resource of the terminal device.

In one embodiment, the method further includes: receiving, by the terminal device, a fourth indication from the network device, where the fourth indication is used to indicate whether an indication used to indicate the uplink transmission resource of the terminal device is used to trigger generation of a buffer status report, and an indication that is received by the terminal device and that is used to indicate the uplink transmission resource of the terminal device includes the first indication; and in the buffer status report triggering state, generating, by the terminal device according to the fourth indication, a buffer status report for an indication that is used to trigger generation of the buffer status report and that is used to indicate the uplink transmission resource of the terminal device.

In one embodiment, the power headroom report includes power headroom information of an activated serving cell of the terminal device, and the power headroom information of the activated serving cell includes power headroom information of a serving uplink beam and/or a serving parameter set of the terminal device.

The serving uplink beam is an uplink beam that can be used for data transmission between the network device and the terminal device, and is usually configured by the network device, and the serving uplink beam may also be referred to as an activated uplink beam. For example, if the terminal device supports five uplink beams, and the network device configures two uplink beams for data transmission between the network device and the terminal device, the two uplink beams are uplink beams used for data transmission between the network device and the terminal device.

The serving parameter set is a parameter set that can be used for data transmission between the network device and the terminal device, and may be usually configured by the network device, and the serving parameter set may also be referred to as an activated parameter set. For example, if the terminal device supports three parameter sets, and the network device configures two parameter sets for data transmission between the network device and the terminal device, the two parameter sets are parameter sets used for data transmission between the network device and the terminal device.

In one embodiment, calculation of the power headroom information of the serving uplink beam and/or the serving parameter set is based on power of an uplink data channel and/or an uplink control channel on a time domain resource occupied by the power headroom report when the power headroom report is generated.

The uplink data channel and/or the uplink control channel on the time domain resource occupied by the power headroom report when the power headroom report is generated are/is an uplink data channel and/or an uplink control channel that are/is learned by a user terminal during generation of the power headroom report and that need/needs to be transmitted on the time domain resource occupied by the power headroom report.

In one embodiment, the power headroom report includes an uplink beam identifier and/or a parameter set identifier.

According to a second aspect, an embodiment of the present invention further provides an information transmission method, including: determining, by a terminal device, whether a trigger condition is met; and entering, by the terminal device, a power headroom report triggering state when the trigger condition is met, where the trigger condition includes any one of the following:

(1) a first timer expires or has expired, and a path loss change of at least one reference serving downlink beam of a serving cell exceeds a third threshold, where the third threshold is a default value or is configured by a network device;

(2) at least one serving uplink beam of a serving cell is activated, configured, or added;

(3) a first timer expires or has expired, power back-off occurs on at least one serving uplink beam used as a reference, and a back-off value exceeds a fourth threshold;

(4) a third timer expires, where the third timer is configured to periodically trigger a PHR, and is configured for a beam, and duration of the third timer is a default value or is configured by a network device;

(5) a first timer expires or has expired, and a path loss change of at least one numerology used as a reference exceeds a fifth threshold, where the fifth threshold is a default value or is configured by a network device;

(6) at least one numerology of a serving cell is activated, added, or configured;

(7) a fourth timer expires, where the fourth timer is configured to periodically trigger a PHR, and is configured for a numerology, and duration of the fourth timer is a default value or is configured by a network device; or (8) a first timer expires or has expired, power back-off occurs on at least one numerology used as a reference, and a back-off value exceeds a sixth threshold, where the sixth threshold is a default value or is configured by a network device.

The power headroom report triggering state is a state in which the terminal device is allowed to generate a power headroom report.

According to a third aspect, an embodiment of the present invention further provides an information transmission method, including: receiving, by a terminal device, a third indication from a network device, where the third indication is used to indicate whether an indication used to indicate an uplink transmission resource of the terminal device is used to trigger generation of a power headroom report; and in a power headroom report triggering state, generating, by the terminal device according to the third indication, a power headroom report for an indication that is used to trigger generation of the power headroom report and that is used to indicate the uplink transmission resource of the terminal device.

Alternatively, the terminal device receives a fourth indication from the network device, where the fourth indication is used to indicate whether an indication used to indicate an uplink transmission resource of the terminal device is used to trigger generation of a buffer status report; and in a buffer status report triggering state, the terminal device generates, according to the fourth indication, a buffer status report for an indication that is used to trigger generation of the buffer status report and that is used to indicate the uplink transmission resource of the terminal device.

Correspondingly, the network device sends a third indication to the terminal device, where the third indication is used to indicate whether an indication used to indicate an uplink transmission resource of the terminal device is used to trigger generation of a power headroom report; or the network device sends a fourth indication to the terminal device, where the fourth indication is used to indicate whether an indication used to indicate an uplink transmission resource of the terminal device is used to trigger generation of a buffer status report.

In one embodiment, it may be considered by default that the indication used to indicate the uplink transmission resource of the terminal device may be used to trigger generation of the power headroom report and/or the buffer status report, the third indication may be used to indicate that an indication used to indicate the uplink transmission resource of the terminal device is not used to trigger generation of the power headroom report, and the fourth indication may be used to indicate that an indication used to indicate the uplink transmission resource of the terminal device is not used to trigger generation of the buffer status report.

In one embodiment, it may be considered by default that the indication used to indicate the uplink transmission resource of the terminal device is not used to trigger generation of the power headroom report and/or the buffer status report, the third indication may be used to indicate that an indication used to indicate the uplink transmission resource of the terminal device is used to trigger generation of the power headroom report, and the fourth indication may be used to indicate that an indication used to indicate the uplink transmission resource of the terminal device is used to trigger generation of the buffer status report.

In one embodiment, the third indication may be used to indicate that an indication used to indicate the uplink transmission resource of the terminal device is used to trigger generation of the power headroom report, and that an indication is not used to trigger generation of the power headroom report. Similarly, the fourth indication may be used to indicate that an indication used to indicate the uplink transmission resource of the terminal device is used to trigger generation of the buffer status report, and that an indication is not used to trigger generation of the buffer status report.

According to a fourth aspect, an embodiment of the present invention further provides an information transmission method, including: when a terminal device is in a power headroom report triggering state, receiving an indication from a network device, where the indication is used to indicate an uplink transmission resource of the terminal device, and the uplink transmission resource is used by the terminal device to perform uplink transmission with the network device; and generating, by the terminal device, a power headroom report according to the indication, where the power headroom report includes power headroom information of an activated serving cell of the terminal device, and the power headroom information of the activated serving cell includes power headroom information of a serving uplink beam and/or a serving parameter set of the terminal device.

In one embodiment, calculation of the power headroom information of the serving uplink beam and/or the serving parameter set is based on power of an uplink data channel and/or an uplink control channel on a time domain resource occupied by the power headroom report when the power headroom report is generated.

In one embodiment, the power headroom report includes an uplink beam identifier and/or a parameter set identifier.

In one embodiment, the method further includes: sending, by the terminal device, the power headroom report on the uplink transmission resource.

It may be understood that the methods provided in the first aspect to the fourth aspect may be independent of each other, or methods provided in at least two of the first aspect to the fourth aspect may be combined. For involved content, refer to each other. Details are not described herein.

According to a fifth aspect, an apparatus is further provided, including a processor and a memory, where the memory is configured to store an instruction, the processor is configured to execute the instruction stored in the memory, and when the processor executes the instruction stored in the memory, the apparatus is configured to complete any method related to the terminal device described in the first aspect to the fourth aspect.

In one embodiment, the apparatus may further include a transceiver.

In one embodiment, the apparatus may be a terminal device or a chip that may be disposed inside the terminal device.

According to a sixth aspect, an apparatus is further provided, including a processor and a memory, where the memory is configured to store an instruction, the processor is configured to execute the instruction stored in the memory, and when the processor executes the instruction stored in the memory, the apparatus is configured to complete any method related to the network device described in the first aspect to the fourth aspect.

In one embodiment, the apparatus may further include a transceiver.

In one embodiment, the apparatus may be a network device or a chip that may be disposed inside the network device.

According to a seventh aspect, an information transmission apparatus is further provided, including some modules, configured to implement any method related to the foregoing terminal device. Specific modules may correspond to method operations, and details are not described herein.

In one embodiment, the apparatus includes one or more processors and a communications unit. The one or more processors are configured to support the apparatus in executing corresponding functions of the terminal device in the foregoing methods, for example, keeping the power headroom report triggering state in a first time period, and canceling the power headroom report triggering state when the first time period expires. The communications unit is configured to support the apparatus in communicating with another device, to implement a receiving and/or sending function, for example, receiving a first indication from a network device.

In one embodiment, the apparatus may further include one or more memories, the memory is configured to couple to the processor, and the memory stores a program instruction and/or data that are/is necessary for the apparatus. The one or more memories may be integrated with the processor, or may be disposed separately from the processor. This is not limited in this application.

The apparatus may be an intelligent terminal or a wearable device, and the communications unit may be a transceiver or a transceiver circuit. In one embodiment, the transceiver may be an input/output circuit or an interface.

The apparatus may be alternatively a communications chip. The communications unit may be an input/output circuit or an interface of the communications chip.

In another embodiment, the apparatus includes a transceiver, a processor, and a memory. The processor is configured to control the transceiver or an input/output circuit to send/receive a signal, the memory is configured to store a computer program, and the processor is configured to run a computer program in the memory, so that the apparatus performs the method completed by the terminal device in the first aspect, the second aspect, the third aspect, the fourth aspect, or any possible embodiment in any one of the first aspect to the fourth aspect.

According to an eighth aspect, an information transmission apparatus is further provided, including some modules, configured to implement any method related to the foregoing network device. Specific modules may correspond to method operations, and details are not described herein.

In another embodiment, the apparatus includes one or more processors and a communications unit. The one or more processors are configured to support the apparatus in executing corresponding functions of the network device in the foregoing methods. The communications unit is configured to support the apparatus in communicating with another device, to implement a receiving and/or sending function, for example, sending a first indication.

In one embodiment, the apparatus may further include one or more memories, the memory is configured to couple to the processor, and the memory stores a program instruction and/or data that are/is necessary for a wireless network device. The one or more memories may be integrated with the processor, or may be disposed separately from the processor. This is not limited in this application.

The apparatus may be a base station, a gNB, a TRP, or the like, and the communications unit may be a transceiver or a transceiver circuit. In one embodiment, the transceiver may be an input/output circuit or an interface.

The apparatus may be alternatively a communications chip. The communications unit may be an input/output circuit or an interface of the communications chip.

In another embodiment, the apparatus includes a transceiver, a processor, and a memory. The processor is configured to control the transceiver or an input/output circuit to send/receive a signal, the memory is configured to store a computer program, and the processor is configured to run a computer program in the memory, so that the apparatus performs the method completed by the network device in the first aspect, the second aspect, the third aspect, the fourth aspect, or any possible embodiment in any one of the first aspect to the fourth aspect. According to a ninth aspect, a computer storage medium is further provided, and is configured to store some instructions. When the instructions are executed, any method related to the foregoing terminal device or network device may be completed.

According to a tenth aspect, a computer program product is further provided, and is configured to store a program or an instruction. When the program or the instruction is executed, any method related to the foregoing terminal device or network device may be completed.

According to an eleventh aspect, a communications system is further provided, including user equipment provided in the fifth aspect or the seventh aspect and a network device provided in the sixth aspect or the eighth aspect.

For ease of understanding, some concepts related to the present invention are provided as examples for reference, and are shown as follows:

A 3rd generation partnership project (3GPP) is a project that is devoted to development of a wireless communications network. Generally, a 3GPP-related institution is referred to as a 3GPP institution.

A wireless communications network is a network that provides a wireless communication function. The wireless communications network may use different communications technologies, such as code division multiple access (CDMA rt), wideband code division multiple access (WCDMA), time division multiple access (TDMA), frequency division multiple access (FDMA), orthogonal frequency division multiple access (OFDMA), single carrier frequency division multiple access (SC-FDMA), and carrier sense multiple access with collision avoidance. Networks may be classified into a 2G network, a 3G network, a 4G network, or a future evolved network such as a 5G network based on factors such as capacities, rates, or latencies of different networks. A typical 2G network includes a global system for mobile communications (GSM) network or a general packet radio service (GPRS) network. A typical 3G network includes a universal mobile telecommunications system (UMTS) network. A typical 4G network includes a long term evolution (LTE) network. The UMTS network may also be referred to as a universal terrestrial radio access network (UTRAN) sometimes, and the LTE network may also be referred to as an evolved universal terrestrial radio access network (E-UTRAN) sometimes. Networks may be classified into a cellular communications network and a wireless local area network (WLAN) based on different resource allocation manners. The cellular communications network is scheduling-dominant, and the WLAN is contention-dominant. All the foregoing 2G, 3G, and 4G networks are cellular communications networks.

The cellular communications network is a type of wireless communications network, and a terminal device is connected to a network device by using a wireless channel in a cellular wireless networking manner, so that users can communicate with each other in an activity. The cellular communications network mainly features terminal mobility, and has functions of cross-cell handover and automatic roaming across local networks.

User equipment (UE) is a terminal device, and may be a movable terminal device, or an immovable terminal device. The device is mainly configured to receive or send service data. The user equipment may be distributed in a network. The user equipment has different names in different networks, such as a terminal, a mobile station, a subscriber unit, a station, a cellular phone, a personal digital assistant, a wireless modem, a wireless communications device, a handheld device, a laptop computer, a cordless telephone set, a wireless local loop station, or an in-vehicle device. The user equipment may communicate with one or more core networks by using a radio access network (RAN) (an access part of the wireless communications network). For example, the user equipment exchanges a voice and/or data with the radio access network.

A base station (BS) device may also be referred to as a base station, and is an apparatus that is deployed in the radio access network to provide a wireless communication function. For example, devices that provide a base station function in a 2G network include a wireless base transceiver station (BTS) and a base station controller (BSC); devices that provide a base station function in a 3G network include a NodeB and a radio network controller (RNC); a device that provides a base station function in a 4G network includes an evolved NodeB (eNB); and a device that provides a base station function in a WLAN is an access point (AP). In a future 5G network such as new radio (NR) or LTE+, a device that provides a base station function includes a continuously evolved NodeB (gNB), a transmission and reception point (TRP), or a transmission point (TP). The TRP or the TP may not include a baseband part, and include only a radio frequency part; or may include a baseband part and a radio frequency part.

A wireless device is a device that is located in a wireless communications network and that can communicate in a wireless manner. The device may be a base station, or may be user equipment, or may be another network element.

A network-side device is a device located on a network side in a wireless communications network, and may be an access network element, such as a base station or a controller (if any), or may be a core network element, or may be another network element.

NR is a new-generation radio access network technology, and may be applied to a future evolved network, such as a 5G network.

A wireless local area network (WLAN) is a local area network that uses a radio wave as a data transmission medium. Generally, a transmission distance is only several decameters.

RRC processes layer-3 information of a control plane between the UE and a wireless access network, and generally includes at least one of the following functions:

broadcasting information provided by a non-access stratum of a core network, where the RRC is responsible for broadcasting network system information to the UE, the system information is usually repeated based on a particular basic law, and the RRC is responsible for plan execution, segmentation, and repetition, and also supports broadcasting of upper-layer information;

associating the broadcast information with an access stratum, where the RRC is responsible for broadcasting network system information to the UE, the system information is usually repeated based on a particular basic law, and the RRC is responsible for plan execution, segmentation, and repetition; and establishing, re-establishing, maintaining, and releasing an RRC connection between the UE and a wireless access network, where to establish the first signal connection of the UE, an upper layer of the UE requests to establish an RRC connection, and an RRC connection establishment process includes operations such as available cell reselection, access permission control, and layer-2 signal link establishment. The upper layer also requests to release the RRC connection, so as to break the last signal connection; or an RRC layer initiates RRC connection release when an RRC link fails. If the connection fails, the UE requests to re-establish the RRC connection. If the RRC connection fails, the RRC releases an allocated resource.

As a network evolves, functions of the RRC may also change, and descriptions herein are not limitations.

A media access control control element (MAC CE) is control signaling, is carried in a MAC layer message, and may be used to implement effective data transmission.

DESCRIPTION OF EMBODIMENTS

Figure 1A:
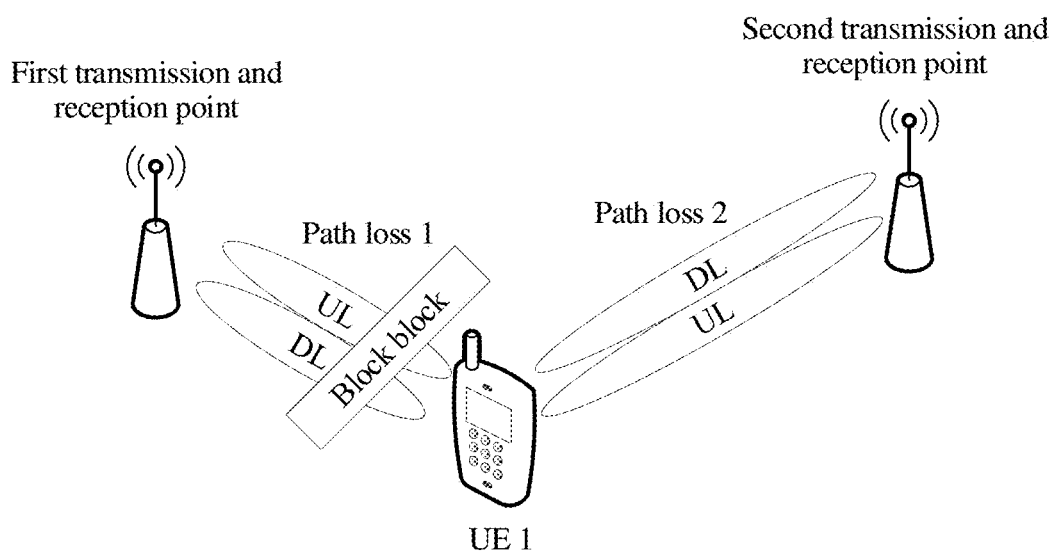
FIG. 1a is a schematic diagram of a path loss change of a serving beam in a multi-beam scenario.

The following describes the technical solutions in the embodiments of the present invention with reference to the accompanying drawings in the embodiments of the present invention. Apparently, the described embodiments are merely some rather than all of the embodiments of the present invention. All other embodiments obtained by a person of ordinary skill in the art based on the embodiments of the present invention without creative efforts shall fall within the protection scope of the present invention.

Terms such as "component", "module", and "system" used in this application are used to indicate computer-related entities. The computer-related entities may be hardware, firmware, combinations of hardware and software, software, or software in running. For example, a component may be but is not limited to a process that runs on a processor, a processor, an object, an executable file, a thread of execution, a program, and/or a computer. As an example, both a computing device and an application that runs on the computing device may be components. One or more components may reside within a process and/or a thread of execution, and the components may be located on one computer and/or distributed between two or more computers. In addition, these components may be executed from various computer-readable media that have various data structures. These components may communicate by using a local and/or remote process and based on, for example, a signal having one or more data packets (for example, data from one component, where the component interacts with another component in a local system or a distributed system, and/or interacts with other systems via a network such as the Internet by using a signal).

In addition, aspects in this application may be described with reference to a wireless network device. The wireless network device is a wireless device, and the wireless device may be alternatively a terminal device. The wireless network device may be a base station, and the base station may be configured to communicate with one or more user equipments, or may be configured to communicate with one or more base stations with some user equipment functions (for example, communication between a macro base station and a micro base station or between access points). The wireless device may be alternatively user equipment, and the user equipment may be configured to communicate with one or more user equipments (for example, D2D communication), or may be configured to communicate with one or more base stations. The user equipment may also be referred to as a user terminal, and may include some or all functions of a system, a subscriber unit, a subscriber station, a mobile station, a mobile wireless terminal, a mobile device, a node, a device, a remote station, a remote terminal, a terminal, a wireless communications device, a wireless communications apparatus, or a user agent. The user equipment may be a cellular phone, a cordless telephone set, a session initiation protocol (SIP) phone, a smartphone, a wireless local loop (WLL) station, a personal digital assistant (PDA), a laptop computer, a handheld communications device, a handheld computing device, a satellite wireless device, a wireless modem card, and/or another processing device used for communication in a wireless system. The base station may also be referred to as an access point, a node, a NodeB, an evolved NodeB (eNB), a gNB, a transmission and reception point (TRP), a transmission point (TP), or another network entity. In addition, the base station may include some or all functions of the foregoing network entities. The base station may communicate with a wireless terminal by using an air interface. The communication may be performed by using one or more sectors. The base station may serve as a router between the wireless terminal and a rest part of an access network by converting a received air interface frame into an IP packet. The access network includes an internet protocol (IP) network. The base station may further coordinate management of an air interface attribute, and may be alternatively a gateway between a wired network and a wireless network.

All aspects, embodiments, or features are presented in this application by describing a system that may include a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may be used.

In addition, the word "example" in the embodiments of the present invention is used to represent giving an example, an illustration, or a description. Any embodiment or design scheme described as an "example" in this application should not be explained as being more preferred or having more advantages than another embodiment or design scheme. Exactly, "for example" is used to present a concept in a specific manner.

In the embodiments of the present invention, one of "information", "signal", "message", or "channel" may be used sometimes. It should be noted that meanings to be expressed are consistent when differences are not emphasized. One of "of", "relevant", or "corresponding" may be used sometimes. It should be noted that meanings to be expressed are consistent when differences are not emphasized.

In the embodiments of the present invention, sometimes a subscript such as $W_1$ may be written as a non-subscript form such as $W_1$ by mistake. When differences are not emphasized, meanings to be expressed are the same.

The network architecture and the service scenario described in the embodiments of the present invention are intended to describe the technical solutions in the embodiments of the present invention more clearly, and do not constitute a limitation on the technical solutions provided in the embodiments of the present invention. A person of ordinary skill in the art may know that with the evolution of the network architecture and the emergence of new service scenarios, the technical solutions provided in the embodiments of the present invention are also applicable to similar technical problems.

The embodiments of the present invention may be applied to a time division duplex (TDD) scenario, and may also be applied to a frequency division duplex (FDD) scenario.

Figure 6:
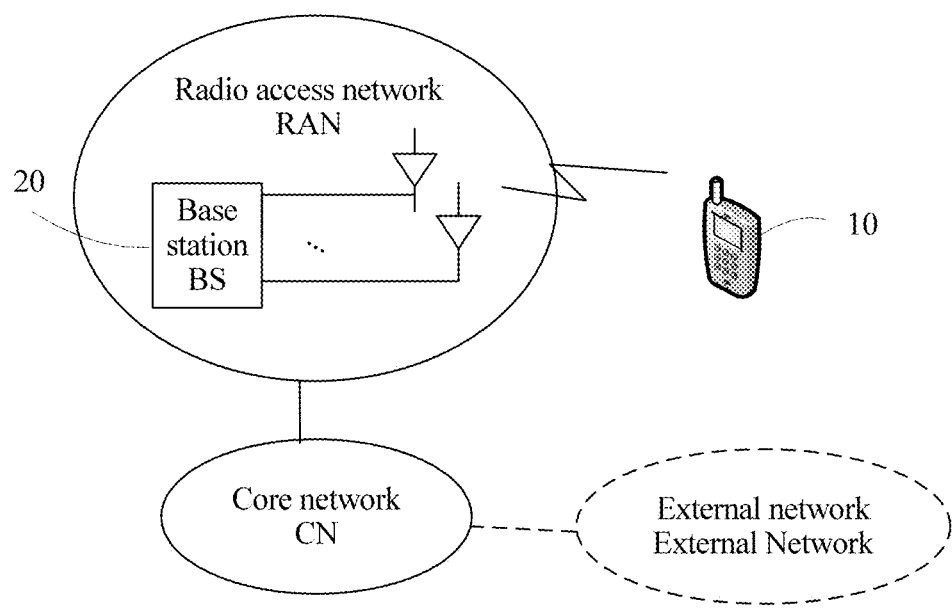
FIG. 6 is a schematic diagram of a possible system network.

FIG. 6 is a schematic diagram of a possible system network according to an embodiment of the present invention. As shown in FIG. 6, at least one user equipment UE 10 communicates with a radio access network (RAN). The RAN includes at least one base station 20 (BS). For clarity, only one base station and one UE are shown in the figure. The RAN is connected to a core network (CN). In one embodiment, the CN may be coupled to one or more external networks, such as the Internet or a public switched telephone network (PSTN).

This embodiment of the present invention may be applied to a conventional typical network, and may also be applied to a future UE-centric network. A non-cell network architecture is introduced into the UE-centric network, to be specific, a large quantity of small cells are deployed in a specific area to form a hyper cell, and each small cell is a TP or a TRP of the hyper cell, and is connected to a centralized controller. When the UE moves in the hyper cell, a network-side device selects a new sub-cluster for the UE in real time to serve the UE, so as to avoid real cell handover and implement service continuity of the UE. The network-side device includes a wireless network device.

In the embodiments of the present invention, a network device is a device that has a radio sending/receiving function or is a chip that may disposed in the device, and the device includes but is not limited to an eNB, a RNC, a NodeB, a BSC, a BTS, a home eNodeB (such as, a home evolved NodeB or a home NodeB), a baseband unit (BBU), an access point (AP) in a wireless fidelity (WIFI) system, a wireless relay node, a wireless backhaul node, a TRP or TP, and the like; or may be a gNB or a transmission and reception point (TRP or TP) in 5G such as an NR system, or one antenna panel or a group of antenna panels (including a plurality of antenna panels) of a base station in a 5G system; or may be a network node that forms a gNB or a transmission and reception point, such as a BBU or a distributed unit (DU).

In some deployments, the gNB may include a centralized unit (CU) and a DU. The gNB may further include a radio frequency unit (RU). The CU implements some functions of the gNB, and the DU implements some functions of the gNB. For example, the CU implements functions of a radio resource control (RRC) layer and a packet data convergence protocol (PDCP) layer, and the DU implements functions of a radio link control (RLC) layer, a media access control (MAC) layer, and a physical (PHY) layer. Information of the RRC layer eventually becomes information of the PHY layer, or is converted from information of the PHY layer. Therefore, in this architecture, higher layer signaling, such as RRC layer signaling or PHCP layer signaling, may also be considered as being sent by the DU or sent by the DU and the RU. It may be understood that the network device may be a CU node, a DU node, or a device including a CU node and a DU node. In addition, the CU may be classified into a network device in an access network RAN, or the CU may be classified into a network device in a core network CN. This is not limited herein.

In the embodiments of the present invention, different base stations may be base stations having different identifiers, or may be base stations that have a same identifier and that are deployed in different geographical locations. Before the base station is deployed, the base station does not know whether the base station is related to a scenario to which the embodiments of the present invention are applied. Therefore, the base station or a baseband chip needs to support the method provided in the embodiments of the present invention before being deployed. It may be understood that the base stations having different identifiers may be base station identifiers, or may be cell identifiers or other identifiers.

In the embodiments of the present invention, some scenarios are illustrated by using an NR network scenario in a wireless communications network as an example. It should be noted that the solutions in the embodiments of the present invention may be alternatively applied to another wireless communications network, and a corresponding name may be replaced with a name of a corresponding function in the another wireless communications network.

It should be noted that the method or the apparatus in the embodiments of the present invention may be applied between a wireless network device and user equipment, or between wireless network devices (such as a macro base station and a micro base station), or between user equipments (such as a D2D scenario). In all embodiments of the present invention, communication between the wireless network device and the UE is used as an example for description.

In wireless communications, a concept of a power headroom (PH) is defined. A specific meaning of the power headroom is a difference between maximum transmit power allowed by the UE and transmit power of an uplink data channel currently obtained through evaluation. A physical uplink shared channel (PUSCH) is used as an example of the uplink data channel, and may be simply represented by using a formula: PH=UEAllowedMaxTransPower−PuschPower. The formula represents how much transmit power the UE can be used in addition to transmit power used for current PUSCH transmission. Because transmit power of the PUSCH needs to be used during PH calculation, a power headroom may be calculated only in a transmission time unit of the PUSCH, such as a subframe. A meaning of the time unit is a time domain resource whose granularity is a time unit in which the PUSCH is scheduled, and the time unit may be a subframe, a slot, or a symbol.

One reason of defining the concept of PH is that the PH may be used as a reference basis for a network device, such as a base station, to allocate an uplink resource, such as a radio block (RB) resource. However, an algorithm design of this reference basis or how the PH affects scheduling of an eNB is determined by an algorithm of each device manufacturer. For example, if a PH value is negative, it indicates that current transmit power of the PUSCH exceeds maximum transmit power allowed by the UE, and in next scheduling, uplink resources allocated by the UE may be reduced; and if a PH value is positive, a quantity of subsequently allocated uplink resources may continue to increase.

One significance of the PH is provided for use by the network device. Therefore, a concept of a power headroom report (PHR) is correspondingly defined, and a power headroom reporting procedure (power headroom reporting procedure) is correspondingly defined, in other words, a procedure in which the UE reports the power headroom to a network-side device. By using the PHR, the UE may provide information about a difference between maximum transmit power of the UE and a transmit power estimate of an uplink data channel of an activated serving cell for the network device, and also provide information about a difference between the maximum transmit power of the UE and both the transmit power estimate of the uplink data channel and a transmit power estimate of an uplink control channel. The uplink data channel may include an uplink data channel of at least one of a PCell, a PSCell, and a PUCCH SCell, and the uplink data channel may include an uplink shared channel UL-SCH. A value of the power headroom may be sent by using a control unit (also referred to as a control element, CE) at a MAC layer. Therefore, a MAC control unit related to this procedure is also referred to as a PHR control unit. A serving cell is a cell that can be used to provide a radio resource for UE in a connected mode. If no carrier aggregation CA or dual-connectivity DC is configured, the UE in the connected mode has only one serving cell. If carrier aggregation (CA) and/or dual connectivity (DC) are/is configured for the UE in the connected mode, the serving cell is at least one cell, including a primary serving cell and all secondary serving cells SCell. The primary serving cell (PCell) is a cell that works at a primary frequency and that may be indicated as a primary serving cell when the UE executes an initial connection establishment process or initiates a connection reestablishment process or in a handover process. The secondary serving cell (SCell) is a cell that works at a secondary frequency, and provides an additional radio resource for the UE in the connected mode. An activated serving cell is a serving cell that can be used for data transmission. A primary secondary serving cell (PSCell) is a cell that may initiate random access when a secondary cell of a secondary eNodeB changes. A PUCCH SCell is an SCell configured with a PUCCH.

In the embodiments of the present invention, the serving cell may support at least one numerology.

In the embodiments of the present invention, the serving cell may further include at least one beam. For example, in a high-frequency scenario, the serving cell may include a plurality of beams.

A beam may be understood as a spatial resource, and may be a sending or receiving precoding vector that has energy transmission directivity. In addition, the sending or receiving precoding vector can be identified by using index information. The energy transmission directivity may be that precoding processing is performed on a to-be-sent signal by using a precoding vector, the signal on which the precoding processing is performed has specific spatial directivity, and relatively large receive power is obtained when the signal on which the precoding processing is performed by using the precoding vector, for example, meeting a received demodulation signal-to-noise ratio. The energy transmission directivity may alternatively mean that different receive power is obtained when same signals sent from different spatial locations are received by using the precoding vector.

In one embodiment, a same communications device (for example, a terminal device or a network device) may have different precoding vectors, and different devices may also have different precoding vectors, in other words, correspond to different beams.

For a configuration or a capability of a communications device, one communications device may use one or more of a plurality of different precoding vectors at a same moment, in other words, may form one or more beams at a same time. Beam information may be identified by using index information. In one embodiment, the index information may correspond to a configured resource identity (identity, ID) of the UE. For example, the index information may correspond to a configured channel state information reference signal (CSI-RS) ID or resource, or may correspond to a configured uplink sounding reference signal (SRS) ID or resource. Alternatively, the index information may be index information that is explicitly or implicitly carried by a signal or a channel carried by a beam. For example, the index information includes but is not limited to beam index information indicated by a synchronization signal or a broadcast channel sent by using a beam.

A beam pair may include a transmit beam (Tx beam) at a transmit end and a receive beam (Rx beam) at a receive end, and the transmit beam or the receive beam is also referred to as an uplink beam or a downlink beam. For example, the beam pair may include a gNB Tx beam transmit beam or a UE Rx beam receive beam, or a UE Tx beam transmit beam or a gNB Rx beam receive beam, and the transmit beam may also be understood as a transmit beam.

One embodiment is as follows:

A reporting condition of a PHR may include the following:

(1) being in a PHR triggering state; and (2) a UL grant allocated by the base station, where the UL grant is used to allocate an uplink transmission resource, including one or more of a physical resource block, a modulation and coding scheme, and a new data indicator (NDI), and in one embodiment, the uplink transmission resource may further include content such as a HARQ process ID and a redundancy version.

One embodiment is as follows: After the UE enters the PHR triggering state and is in the PHR triggering state, provided that the UL grant sent by the base station is received and the UL grant is used to allocate an uplink transmission resource of a serving cell, the UE may generate a PHR MAC CE based on the UL grant, and send the PHR MAC CE to the base station based on the UL grant.

Another embodiment is as follows:

A reporting condition of a PHR may include the following:

(1) being in a PHR triggering state;

(2) a UL grant allocated by the base station, where the UL grant is used to allocate an uplink transmission resource, including one or more of a physical resource block, a modulation and coding scheme, and a new data indicator (NDI), and in one embodiment, the uplink transmission resource may further include content such as a HARQ process ID and a redundancy version; and (3) the UL grant is used to trigger generation of a PHR.

One embodiment is as follows: After the UE enters the PHR triggering state and is in the PHR triggering state, provided that the UL grant sent by the base station is received, the UL grant is used to allocate an uplink transmission resource of a serving cell, and the UE determines that the UL grant is used to trigger generation of a PHR, the UE may generate a PHR MAC CE based on the UL grant, and send the PHR MAC CE to the base station based on the UL grant. If the UE determines that the UL grant is not used to trigger generation of a PHR, the UE does not generate a PHR for the UL grant.

In addition to the foregoing PHR reporting, this embodiment of the present invention further provides a related design of a buffer status report (BSR) in a multi-numerology and/or multi-beam scenario.

The BSR is used to report how much data currently in an uplink cache of the UE needs to be transmitted. The base station allocates an uplink transmission resource based on a BSR reported by the UE.

Based on different services, the UE may set up a plurality of radio bearers (radio bear). Each radio bearer corresponds to one logical channel. If the UE reports a BSR on each logical channel, a large amount of signaling overheads is caused.

To avoid the overheads, a concept of a logical channel group (LCG) (4 in total) is introduced into LTE, and each logical channel is placed into one LCG. The UE reports the BSR based on the LCG instead of reporting a BSR for each logical channel.

Logical channels are grouped to provide a better BSR reporting mechanism. Logical channels with similar scheduling requirements are placed into a same LCG, and a data buffer status of the LCG is reported by using a short BSR.

In an LTE protocol, a BSR triggering manner may include at least one of the following cases:

1. Data with a higher priority arrives: If the UE has sent a BSR and is waiting for a UL grant (in this case, there is data to be sent on a logical channel), and data with a higher priority (in other words, a priority of a logical channel to which the data belongs is higher than a priority of a logical channel of any LCG) needs to be transmitted, the UE triggers reporting of a BSR. The BSR is referred to as a "regular BSR".

2. An uplink data buffer of the UE is empty and new data arrives: When all logical channels of all LCGs have no uplink data that can be sent, if any logical channel belonging to any LCG in this case has data that can be sent, the UE triggers reporting of a BSR. For example, the UE sends uplink data for the first time. The BSR is referred to as a "regular BSR".

3. A padding resource is used: When the UE has an uplink resource and finds that to-be-sent data is insufficient to fill the resource, extra bits are used for padding. These resources can be used to transmit useful data such as a BSR.

Therefore, when a quantity of padding bits is equal to or greater than a size of "BSR MAC CE+corresponding subheader", the UE sends the BSR by using these bits. The BSR is referred to as a "padding BSR".

4. To avoid a case in which the UE has sent a BSR but receives no UL grant, when a retxBSR-timer timer expires, and any logical channel of any LCG of the UE has data that can be sent, reporting of a regular BSR is triggered. The retxBSR-timer timer is configured to trigger the BSR once when the UE has sent a BSR MAC CE but receives no scheduling resource within time of the timer.

5. A buffer status is periodically updated to an eNB: A periodicBSR-timer timer expires, and reporting of a periodic BSR is triggered. The periodicBSR-timer is configured to periodically have/enter a BSR triggering state.

The following specifically describes aspects such as cancellation of a PHR and/or BSR triggering state, generation of a PHR in a multi-numerology and/or multi-beam scenario, a trigger condition for UE to enter the PHR triggering state in the multi-numerology and/or multi-beam scenario, and a PHR and/or BSR reporting condition. It may be understood that one or more of these aspects may be separately applied to a communications system, or may be applied to the communications system in combination.

1. Trigger Condition for UE to Enter a PHR Triggering State in a Multi-Numerology and/or Multi-Beam Scenario In an LTE protocol, there are the following descriptions for the UE entering the PHR triggering state:

A Power Headroom Report (PHR) shall be triggered if any of the following events occur:

prohibitPHR-Timer expires or has expired and the path loss has changed more than dl-PathlossChange dB for at least one activated Serving Cell of any MAC entity which is used as a pathloss reference since the last transmission of a PHR in this MAC entity when the MAC entity has UL resources for new transmission;

periodicPHR-Timer expires;

upon configuration or reconfiguration of the power headroom reporting functionality by upper layers [8], which is not used to disable the function;

activation of an SCell of any MAC entity with configured uplink;

addition of the PSCell;

prohibitPHR-Timer expires or has expired, when the MAC entity has UL resources for new transmission, and the following is true in this TTI for any of the activated Serving Cells of any MAC entity with configured uplink:

there are UL resources allocated for transmission or there is a PUCCH transmission on this cell, and the required power backoff due to power management (as allowed by P-MPRc [10]) for this cell has changed more than dl-PathlossChange dB since the last transmission of a PHR when the MAC entity had UL resources allocated for transmission or PUCCH transmission on this cell.

In the foregoing descriptions:

The trigger condition for the UE to enter the PHR triggering state (namely, a trigger condition of a PHR) is:

The terminal device enters the power headroom report triggering state when the trigger condition is met, and the trigger condition includes any one of the following:

(1) A first timer expires or has expired, and a path loss change value of a reference activated serving cell is greater than a first threshold, where the first threshold is a default value or is configured by a radio resource control (RRC) layer, and the first timer is configured to prevent the terminal device from continuously triggering a PHR.

(2) A second timer expires, where the second timer is configured to periodically trigger a PHR, duration of the second timer is a default value or is configured by an RRC layer, and the second timer is configured for a MAC entity.

(3) PHR function configuration or reconfiguration from an upper layer is received, and the configuration or reconfiguration is not used to disable a PHR function.

(4) A secondary serving cell (SCell) with configured uplink transmission is activated.

(5) A first timer expires or has expired, transmit power back-off occurs in uplink transmission of an activated serving cell, and a power back-off value exceeds a second threshold.

(6) A primary serving cell (PSCell) of a secondary eNodeB with dual connectivity is added.

A primary serving cell in a CA scenario or a primary serving cell in a primary eNodeB with dual connectivity may be referred to as a PCell, and a secondary serving cell of the secondary eNodeB with dual connectivity is referred to as a PSCell. A secondary serving cell in the CA scenario and a secondary serving cell of the primary eNodeB with dual connectivity may be referred to as SCells.

In NR, in a serving cell that has no beam operation or a single beam operation, the foregoing trigger conditions may be used as baselines for triggering a PHR.

In a beamforming scenario, for transmission robustness, a base station and the UE may support a multi-beam operation in a cell. For example, the UE may communicate with the base station by using a plurality of beam pairs in a cell.

One embodiment of a beamforming scenario is a high-frequency cell scenario. Generally, a high-frequency cell may be understood as that an operating frequency band of the cell is greater than or equal to 6 GHz. High-frequency transmission has a large path loss. To ensure effective transmission of a service, a beamforming technology is introduced into the high-frequency cell. In the technology, energy of a signal does not need to be distributed in all directions, but is concentrated in a required direction/beam, to form a narrow beam that points to the UE. Transmit energy points to target UE, thereby improving a demodulation signal-to-noise ratio of the target UE and improving cell edge user experience. The UE and the base station may perform data transmission in at least one beam pair in a same time unit. The beam pair is a gNB Tx beam and a UE Rx beam, or a UE Tx beam and a gNB Rx beam.

In the NR, to improve transmission robustness, the UE may maintain a connection, to at least one TRP, of a plurality of downlink and/or uplink serving beam pairs of a cell. The serving beam pair is a beam pair that provides radio resources for UE in a connected or activated state. The UE in the connected mode is UE that maintains an RRC connection between the UE and an access network device and a connection between the access network device and a core network device. The UE in the activated state is UE that maintains a connection between the access network device and the core network device, and that has no RRC connection between the UE and the access network device. UE in an idle mode is UE that has no connection between the access network device and the core network device and no RRC connection between the UE and the access network device. At least one TRP may be located in different geographical locations, to expand cell coverage. Therefore, in some scenarios, channel conditions of serving downlink beam pair connections between the UE and different TRPs may be independent of each other. Therefore, when the UE moves to a new location, channel quality, such as a path loss, of some serving beam pairs may decrease due to some temporary blocking, such as tree blocking, and at the same time, channel quality of some other serving beams is still good. The serving beam or the serving beam pair is a beam or a beam pair that can provide a radio resource for the UE in the connected mode or the UE in the activated state, and the serving beam includes a serving uplink beam and/or a serving downlink beam. The serving beam pair may be understood as a serving beam. As shown in an example in FIG. 1a, a serving downlink beam connection of a TRP 1 is blocked, and a serving downlink beam connection of a TRP 2 is still good. Path loss measurement used for uplink power control may be based on at least one type of downlink reference signal used for beam measurement and support of beam-specific power control, it is very important to report information related to a beam pair connection, and one type of information may be power headroom information. Therefore, by using the PHR, the base station may take a beam-related path loss into consideration as early as possible when selecting a proper scheduling policy, to effectively use a beam-specific resource. Therefore, the UE may trigger the PHR when a change of a path loss related to at least one serving beam pair connection of an activated serving cell exceeds a third threshold, in other words, enter the PHR triggering state. Considering flexibility of the base station, the third threshold may be configured by a network side.

It can be learned from the foregoing descriptions in the LTE protocol that the PHR may be triggered when the SCell with configured uplink transmission is activated, so that the base station may consider the PHR as early as possible for subsequent scheduling. An NR cell with a beam operation supports beam management, and an available serving beam pair may change due to UE movement, as shown in FIG. 1b. Therefore, in some scenarios, if at least one new serving beam pair is configured in a beam management process, for example, in a scenario in FIG. 1b, a serving beam pair between the UE to a TRP 1 is switched to a serving beam pair between the UE and a TRP 2, the UE triggers a PHR, thereby facilitating scheduling of the base station.

Based on the foregoing descriptions, this embodiment of the present invention proposes that in addition to the existing trigger conditions in the LTE, the trigger condition may further include any one of the following. When any one of the following trigger conditions is met, the UE may trigger a PHR, in other words, the UE enters the PHR triggering state.

(1) A first timer expires or has expired, and a path loss change of at least one reference serving downlink beam of a serving cell exceeds a third threshold, where the third threshold is a default value or is configured by a network device.

(2) At least one serving uplink beam of a serving cell is activated, configured, or added.

(3) A first timer expires or has expired, power back-off occurs on at least one serving uplink beam used as a reference, and a back-off value exceeds a fourth threshold, where the third threshold is a default value or is configured by a network device.

(4) A third timer expires, where the third timer is configured to periodically trigger a PHR, and is configured for a beam, and duration of the third timer is a default value or is configured by a network device.

Similarly, a cell in the NR may support a plurality of numerologies, and the UE may also support a plurality of cells. In addition, after multi-numerology is introduced, scheduling of the UE by the base station is related to a numerology used for transmission. Different numerologies of a same cell may be in different channel quality, so that channel quality corresponding to the numerology may be considered for scheduling of the UE. This embodiment of the present invention proposes that in addition to the existing trigger conditions in the LTE, the trigger condition may further include any one of the following. When any one of the following trigger conditions is met, the UE may trigger a PHR, in other words, the UE enters the PHR triggering state.

(1) A first timer expires or has expired, and a path loss change of at least one numerology used as a reference exceeds a fifth threshold, where the fifth threshold is a default value or is configured by a network device.

(2) At least one numerology of a serving cell is activated, added, or configured.

(3) A fourth timer expires, where the fourth timer is configured to periodically trigger a PHR, and is configured for a numerology, and duration of the fourth timer is a default value or is configured by a network device.

(4) A first timer expires or has expired, power back-off occurs on at least one numerology used as a reference, and a back-off value exceeds a sixth threshold, where the sixth threshold is a default value or is configured by a network device.

It may be understood that there may also be a multi-serving cell scenario, a multi-beam scenario, and a multi-numerology scenario in communication between the base station and the UE. Therefore, the foregoing trigger condition for a plurality of serving cells (as described in the LTE), the trigger condition for a plurality of beams, and the trigger condition for a plurality of numerologies may all be used as the trigger condition for the UE to enter the PHR triggering state.

In one embodiment, when the UE enters the PHR triggering state and is in the PHR triggering state, the UE may generate a PHR for UL grants received in the activated serving cell, all numerologies (if there are a plurality of numerologies), and all beams (if there are a plurality of beams).

In one embodiment, when the UE enters the PHR triggering state and is in the PHR triggering state, the UE may generate or construct, according to a specific rule or an indication from the base station, a PHR for a UL grant received on some qualified serving cells, numerologies, or beams.

In one embodiment, the triggering state is at a MAC entity level, and is not at a cell level, or at a beam or numerology level. It may be understood that when the UE enters the PHR triggering state, generation of a PHR may be generated provided that a UL grant of a serving cell served by the MAC entity is received and the UL grant may be used to trigger generation of the PHR, and the UL grant of the serving cell may be further used to indicate an uplink radio resource of a beam or a radio resource of a numerology. If DC is configured for the UE, the UE may maintain two MAC entities.

2. Cancellation of a PHR and/or BSR Triggering State

After the UE enters the PHR triggering state, in the LTE protocol, the UE may report PHs of all activated serving cells to the base station by using a PHR. The PH reports different types of PHs based on whether the UE supports or is configured with simultaneous transmission of an uplink control channel such as a physical uplink control channel (PUCCH) and an uplink data channel such as a physical uplink data channel (PUSCH). If the UE supports or is configured with simultaneous transmission, a type-2 PH is reported. If the UE does not support or is not configured with simultaneous transmission, a type-1 PH is reported. When the UE generates a PHR, if no resource is scheduled in a cell, the UE reports a virtual type-1 or type-2 PH, or if a resource is scheduled in a cell, the UE reports a real type-1 or type-2 PH. In addition, once the UE generates the PHR, such as a PHR MAC CE, the UE cancels the PHR triggering state. A physical layer of the UE calculates the PH, and submits the calculated PH to a MAC layer of the UE. The MAC layer of the UE generates or constructs the PHR based on the submitted PH.

When an activated serving cell includes a plurality of beams or a plurality of numerologies, once the UE generates the PHR, the UE cancels the PHR triggering state, and consequently a PH value included in a reported PHR cannot reflect a real situation of an uplink channel resource, and consequently the base station cannot obtain a relatively accurate PH for scheduling, thereby affecting communication reliability.

Similarly, when an activated serving cell includes a plurality of beams or a plurality of numerologies, once the UE generates a BSR, the UE cancels the BSR triggering state, and consequently a BS value included in a reported BSR cannot reflect a real situation of a data cache of the UE, and consequently the base station cannot obtain a relatively accurate BS for scheduling, thereby wasting radio resources.

Figure 2A:
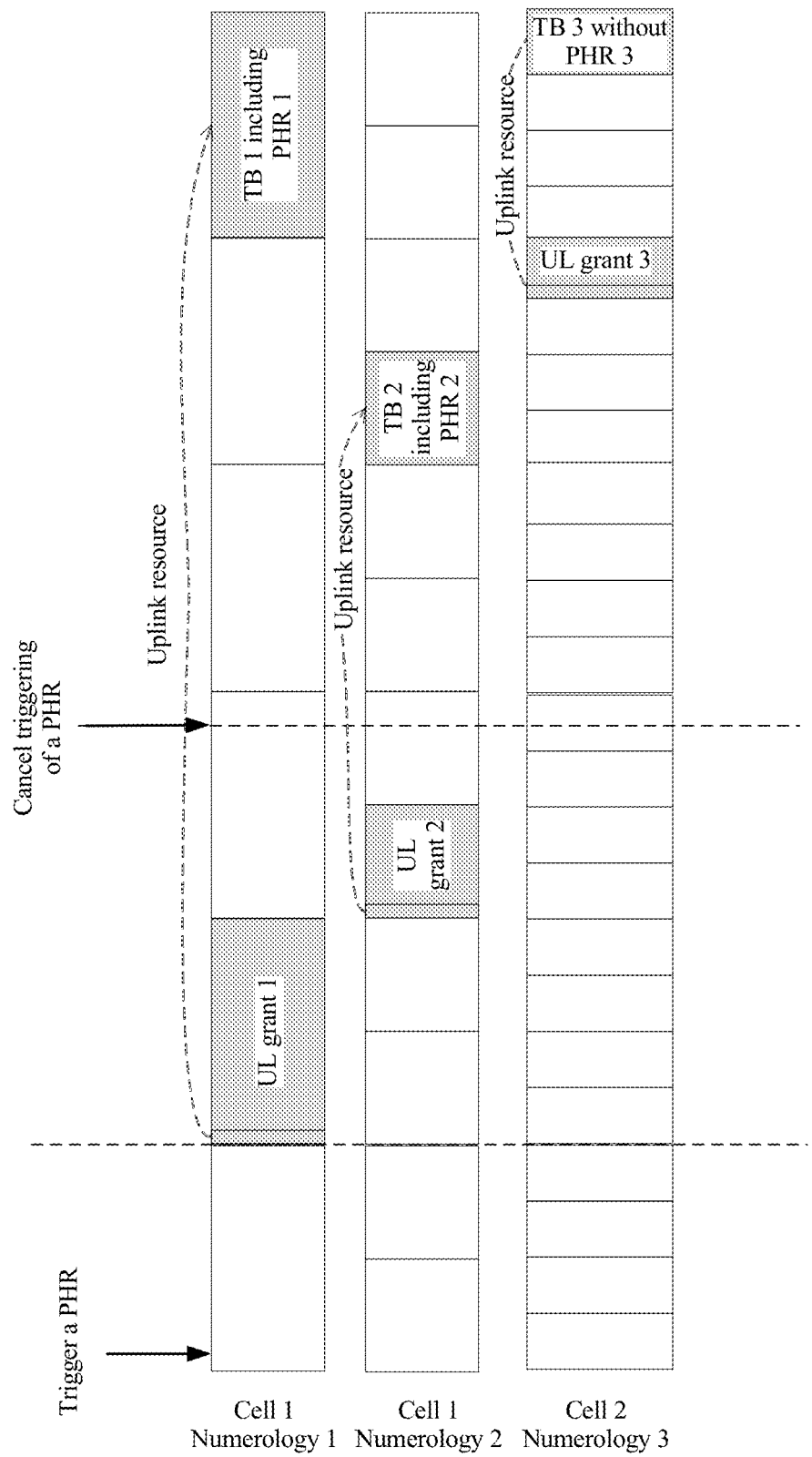
FIG. 2a is a schematic diagram of a time sequence for triggering and generating PHRs in a multi-cell and multi-numerology scenario.

A PHR is used as an example. As shown in FIG. 2a, two types of numerologies are configured for a cell, and one type of numerology is configured for another cell. A cell 1 uses numerologies 1 and 2, a cell 2 uses a numerology 3, a UL grant 1 is delivered by using the numerology 1 of the cell 1, a UL grant 2 is delivered by using the numerology 2 of the cell 1, and a UL grant 3 is delivered by using the numerology 3 of the cell 2. TTIs of the numerologies 1, 2 and 3 are all different. The numerology 1 has the longest TTI, and the numerology 3 has the shortest TTI. A time domain resource of uplink transmission scheduled by the UL grant 3 overlaps a time domain resource of uplink transmission scheduled by the UL grant 1. According to an existing rule of canceling a PHR triggering state in the LTE, when a PHR is generated after the UL grant 1 is received, a UL grant 3 of a cell 3 is not received, and therefore, impact of scheduling of the UL grant 3 on a PH cannot be considered in the generated PHR. If the UE is not in the PHR triggering state when the UL grant 3 of the cell 3 is received, the UE does not trigger a PHR for the UL grant 3. Therefore, the base station cannot learn a real PH on an uplink transmission time domain resource, thereby affecting scheduling reliability of the base station.

Figure 2B:
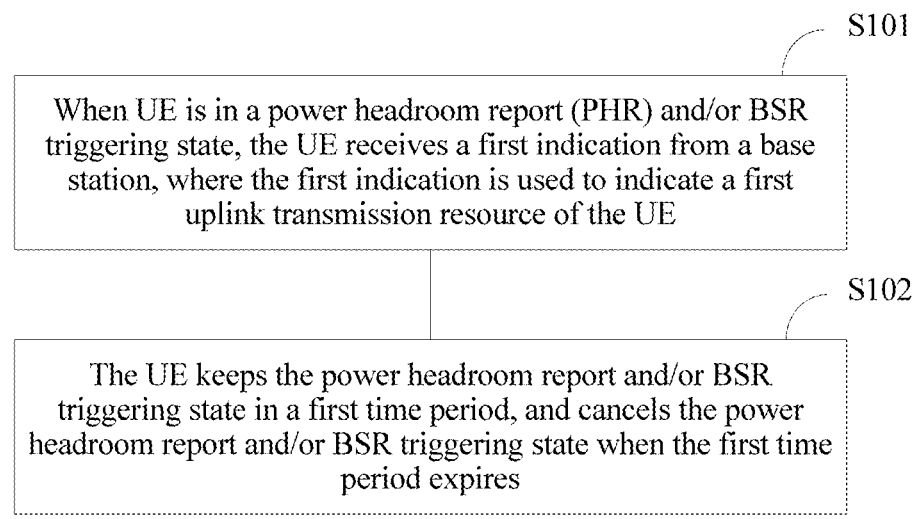
FIG. 2b is a schematic flowchart of an information transmission method according to an embodiment of the present invention.

As shown in FIG. 2b, an embodiment of the present invention provides an information transmission method, and the method includes the following operations.

S101. When UE is in a power headroom report (PHR) triggering state, the UE receives a first indication from a base station, where the first indication is used to indicate a first uplink transmission resource of the UE, and the uplink transmission resource is used by the UE to perform uplink transmission with the base station.

In one embodiment, the first indication is an indication that is first received in a time sequence after the UE enters the PHR triggering state and that is used to indicate an uplink transmission resource, or is a first uplink transmission resource. The first uplink transmission resource may be pre-allocated by the base station, for example, a semi-statically scheduled resource or a contention-based uplink resource.

S102. The UE keeps the power headroom report triggering state in a first time period, and cancels the power headroom report triggering state when the first time period expires.

In the first time period, the PHR triggering state is not canceled, so that the UE may continue to generate a PHR, for example, a PHR MAC CE.

In one embodiment, if a TTI length of the first uplink transmission resource is a first TTI length, the PHR triggering state is not canceled in the first time period. When the UE has another uplink transmission resource, and a TTI length of the another uplink transmission resource is less than the first TTI length, the UE may continue to generate a PHR.

It may be understood that, generation of the PHR in this embodiment of the present invention may be further understood as constructing the PHR. Generation of the PHR MAC CE including the PHR is used as an example, but the PHR is not limited to the MAC CE, and may also be included in other signaling other than the MAC CE.

The first time period is: a second time period starting from a receiving time point of the first indication to a time domain end of the first uplink transmission resource indicated by the first indication; or a third time period starting from a receiving time point of the first indication to a time point of receiving a response signal sent by the base station to indicate that data sent on the first uplink transmission resource is successfully received; or a fourth time period starting from a receiving time point of the first indication to a time point of generating a power headroom report based on a second indication corresponding to a shortest transmission time interval after the second indication is received, where the second indication is used to indicate a second uplink transmission resource of the UE; or a fifth time period starting from a receiving time point of the first indication and having fifth duration, where the fifth duration is a default value or comes from the base station.

Similarly, for a BSR, an embodiment of the present invention provides an information transmission method, and the method includes the following operations.

S101'. When UE is in a BSR triggering state, the UE receives a first indication from a base station, where the first indication is used to indicate a first uplink transmission resource of the UE, and the uplink transmission resource is used by the UE to perform uplink transmission with the base station.

In one embodiment, the first indication is an indication that is first received by the UE after the UE enters the BSR triggering state and that is used to indicate an uplink transmission resource.

S102'. The UE keeps the BSR triggering state in a first time period, and cancels the BSR triggering state when the first time period expires.

In the first time period, a triggered BSR is not canceled, so that the UE may continue to generate a BSR, for example, a BSR MAC CE.

It may be understood that, generation of the BSR in this embodiment of the present invention is described by using generation of the BSR MAC CE including the BSR as an example, but the BSR is not limited to the MAC CE, and may also be included in other signaling other than the MAC CE.

The first time period is: a second time period starting from a receiving time point of the first indication to a time domain end of the first uplink transmission resource indicated by the first indication; or a third time period starting from a receiving time point of the first indication to a time point of receiving a response signal sent by the base station to indicate that data sent on the first uplink transmission resource is successfully received; or a fourth time period starting from a receiving time point of the first indication to a time point of generating a BSR based on a second indication corresponding to a shortest transmission time interval after the second indication is received, where the second indication is used to indicate a second uplink transmission resource of the UE; or a fifth time period starting from a receiving time point of the first indication and having fifth duration, where the fifth duration is a default value or comes from the base station.

It may be understood that the first time period includes the receiving time point of the first indication that is used as a start.

It may be understood that, although same nouns such as the first indication, the first time period, the second time period, the third time period, the fourth time period, the fifth time period, and the second indication are used to describe solutions of the PHR and the BSR, this only indicates that definitions of the nouns are similar, and does not necessarily indicate that values of the nouns are the same.

It may be understood that the generation or construction of the PHR may include generation of the PHR at a MAC layer, for example, generation of a MAC control element (CE) including the PHR, and the generation of the BSR may include generation of the BSR at the MAC layer, for example, generation of a MAC CE including the BSR.

In the foregoing method, the PHR triggering state is not simply canceled when the MAC CE including the PHR is generated, but is improved in terms of a time point for canceling the PHR triggering state, so that the PHR triggering state is more adaptable to a multi-numerology scenario, and accuracy of a PH reported in the multi-numerology scenario can be improved, thereby improving scheduling accuracy of the base station and improving communication reliability.

Further, the third time period using, as an end, the time point of receiving the response signal sent by the base station to indicate that data sent on the first uplink transmission resource is successfully received can ensure correct receiving of the PHR, thereby further improving communication reliability.

Further, based on the fourth time period using, as an end, the time point of generating the power headroom report based on the second indication corresponding to the shortest transmission time interval after the second indication is received, a power headroom of the UE can be more accurately known. The fourth time period can be specially applied to a high-frequency cell (HF cell) scenario, a TTI of the HF cell is usually relatively short, but there is a large amount of to-be-transmitted data. Therefore, scheduling of the HR cell by the PHR is relatively important.

Similarly, a same effect may also be obtained from a BSR solution.

In one embodiment, the first time period includes the time point used as an end.

In one embodiment, the first time period does not include the time point used as an end.

In one embodiment, that the fifth duration comes from the base station may be specifically in a dynamic configuration manner, for example, the fifth duration is carried by using downlink control information; or may be in a semi-static configuration manner, for example, the fifth duration is carried by using radio resource control signaling.

In one embodiment, the uplink transmission resource includes a time-frequency resource and at least one of the following: a modulation and coding scheme, a HARQ process, an indication of new transmission or retransmission, and a redundancy version.

In one embodiment, before receiving the first indication, the UE has triggered at least one PHR and/or BSR (in other words, at least one of the trigger conditions is met), and the at least one PHR and/or BSR is not canceled by the UE. In one embodiment, the first indication may be uplink grant information (UL Grant). The first indication may be an indication that is first received (if a plurality of UL grants are received at a same time, the indication is any UL grant) by the UE in a receiving time sequence when the trigger condition is met and that indicates new transmission and has a relatively long TTI to indicate the uplink transmission resource, for example, a UL grant.

In one embodiment, the second uplink transmission resource includes a second time domain resource, the first uplink transmission resource includes a first time domain resource, and the first time domain resource and the second time domain resource may partially overlap or are completely different.

In one embodiment, the power headroom report may be included in a MAC CE, and the uplink transmission resource may include a time-frequency resource of the MAC CE, or may include a beam resource.

In one embodiment, the buffer status report may be included in a MAC CE, and the uplink transmission resource may include a time-frequency resource of the MAC CE, or may include a beam resource.

In one embodiment, the first indication may include one or more of the modulation and coding scheme, a HARQ process, an indication of whether the MAC CE is newly transmitted or retransmitted, a redundancy version of the MAC CE, and the like.

In one embodiment, the first indication used to indicate the first uplink transmission resource of the UE or the second indication is a message that carries uplink grant information. The message that carries the uplink grant information may be an uplink grant message.

In one embodiment, the first indication used to indicate the first uplink transmission resource of the UE or the second indication is carried in downlink control information.

In one embodiment, the first indication may be obtained through scrambling by using a cell temporary identifier.

In one embodiment, the first indication is related to a parameter set, and/or is related to a beam.

In one embodiment, the first indication and/or the second indication are/is an indication used for new transmission. The new transmission may also be referred to as initial transmission.

In one embodiment, the first time period includes at least one time unit, and the time unit may be at least one of a subframe, a symbol, a transmission time interval (TTI), or a slot.

In one embodiment, the first indication is an indication that is first received by the UE after the UE enters the power headroom report triggering state and that corresponds to a relatively long transmission time interval and is used to indicate the uplink transmission resource of the UE.

In one embodiment, the first indication is an indication that is first received by the UE after the UE enters the buffer status report triggering state and that corresponds to a relatively long transmission time interval and is used to indicate the uplink transmission resource of the UE.

In one embodiment, the first uplink transmission resource has a first parameter set, and the parameter set includes a subcarrier spacing, a cyclic prefix length, and a transmission time interval; and/or the first uplink transmission resource includes a first uplink beam or a first uplink beam set, and the uplink beam set includes at least one uplink beam.

In one embodiment, the second uplink transmission resource has a second parameter set, and the second parameter set is different from the first parameter set in terms of at least one of three parameters included in the parameter sets: a subcarrier spacing, a cyclic prefix length, and a transmission time interval; and/or the second uplink transmission resource includes a second uplink beam or a second uplink beam set, the uplink beam set includes at least one uplink beam, the second uplink beam is different from the first uplink beam, and the second uplink beam set is different from the first uplink beam set.

In this embodiment of the solution of the present invention, the PHR triggering state may be further understood as a triggered PHR.

In one embodiment, a first PHR, such as a first PHR MAC CE, is generated or constructed based on the first indication and the UE being in the PHR triggering state. The first PHR MAC CE is sent, according to the first indication, to the base station in a time-frequency resource included in the first uplink transmission resource indicated by the first indication. The UE starts or restarts a PHR periodic timer, such as at least one of a second timer, a third timer, and a fourth timer, and/or the foregoing first timer, such as a PHR prohibit timer in a corresponding time unit for sending the first PHR MAC CE.

In one embodiment, after receiving the first indication, the UE receives at least one UL grant (in this embodiment of the present invention, an indication used to indicate the uplink transmission resource is referred to as a UL grant) sent by the base station, and the at least one UL grant indicates new transmission. If the uplink transmission resource (mainly referring to a time domain resource location) indicated by the at least one UL grant is located in the first time period, that the UE generates at least one PHR and/or BSR MAC CE based on the at least one UL grant may be further understood as: One PHR and/or BSR MAC CE is generated based on each of the at least one UL grant, and these PHR and/or BSR MAC CEs are sent to the base station. These PHR and/or BSR MAC CEs are not sent together, but are sent separately. Time domain locations for sending the PHR and/or BSR MAC CEs may be completely different, or may partially overlap.

In one embodiment, if time-frequency resources in uplink transmission resources indicated by a plurality of UL grants (including the first indication) are the same or have an overlapping area, the UE may select one of the plurality of UL grants, generate a PHR and/or BSR MAC CE based on the selected UL grant and the UE being in the PHR and/or BSR triggering state, and send the PHR and/or BSR MAC CE to the base station. The PHR and/or BSR MAC CE may be sent by using an uplink transmission resource indicated by one of the plurality of UL grants. A specific selected UL grant may be indicated by the base station, or may be implemented by the terminal device at random. It may be further understood that if the time-frequency resources in the uplink transmission resources indicated by the plurality of UL grants are the same or time points of receiving the plurality of UL grants are the same, the terminal device generates only one PHR and/or BSR MAC CE for the plurality of UL grants, to reduce overheads of radio resources. The at least one UL grant includes at least one UL grant of a radio air interface, and the at least one UL grant is used to indicate an uplink resource of at least one radio air interface of at least one serving cell. The radio air interface may also be referred to as a numerology, and may be understood as a parameter set of at least one of a subcarrier spacing, a cyclic prefix CP length, and a TTI length. For example, the subcarrier spacing is 15 kHz×2n, where n is an integer. One serving cell may support at least one numerology. For example, the first indication is used to indicate uplink transmission of a relatively long TTI, and a UL grant in the at least one UL grant except the first indication may indicate uplink transmission of a relatively short TTI. For example, a TTI length of uplink transmission indicated by the first indication is 1 ms, and a TTI length of uplink transmission indicated by the at least one UL grant is at least one of 0.1 ms/0.5 ms/0.2 ms. The UE generates at least one PHR and/or BSR MAC CE based on the at least one UL grant and the UE being in the PHR triggering state, and sends the at least one PHR and/or BSR MAC CE to the base station based on the uplink transmission resource indicated by the at least one UL grant.

In one embodiment, the UE may further introduce the second timer. The second timer is used to control whether a PHR and/or BSR MAC CE can be generated based on a UL grant (indicating new transmission) of at least one numerology. It may be further understood that the UE may need to maintain different second timers for different numerologies, and duration of the second timers of different numerologies may be the same or may be different. In one embodiment, the duration of the timer may be configured by the base station, or may be a value (namely, a default value) pre-stipulated in a protocol. Specifically, even if the UL grant of the at least one numerology is received during running of the second timer, the PHR and/or BSR MAC CE is not generated. The PHR and/or BSR MAC CE is generated only if a PHR is triggered and is not canceled in a period in which the second timer is not running and the terminal device receives the UL grant of the at least one numerology. After generating a PHR and/or BSR MAC CE, the UE starts a corresponding second timer, for example, in a time unit for transmitting the PHR and/or BSR MAC CE.

In one embodiment, when the first time period expires, the UE may further start or restart a periodic timer, such as one or more of the second timer, the third timer, and the fourth timer, and/or a prohibit timer, such as the first timer.

In one embodiment, the first time period may be controlled by using a timer. After receiving the first indication, the UE starts a timer whose duration is duration of the first time period. When or after the first timer expires, the PHR and/or BSR triggering state is canceled. Duration of the timer may be indicated by the base station, or may be calculated based on a case pre-stipulated in the protocol, for example, the foregoing several cases of canceling the PHR triggering state. A counting unit of the first timer may be at least one of a subframe, a symbol, a TTI, and a slot.

For example, the foregoing method is specifically described by using a PHR in a multi-numerology and multi-cell scenario as an example.

Figure 2C:
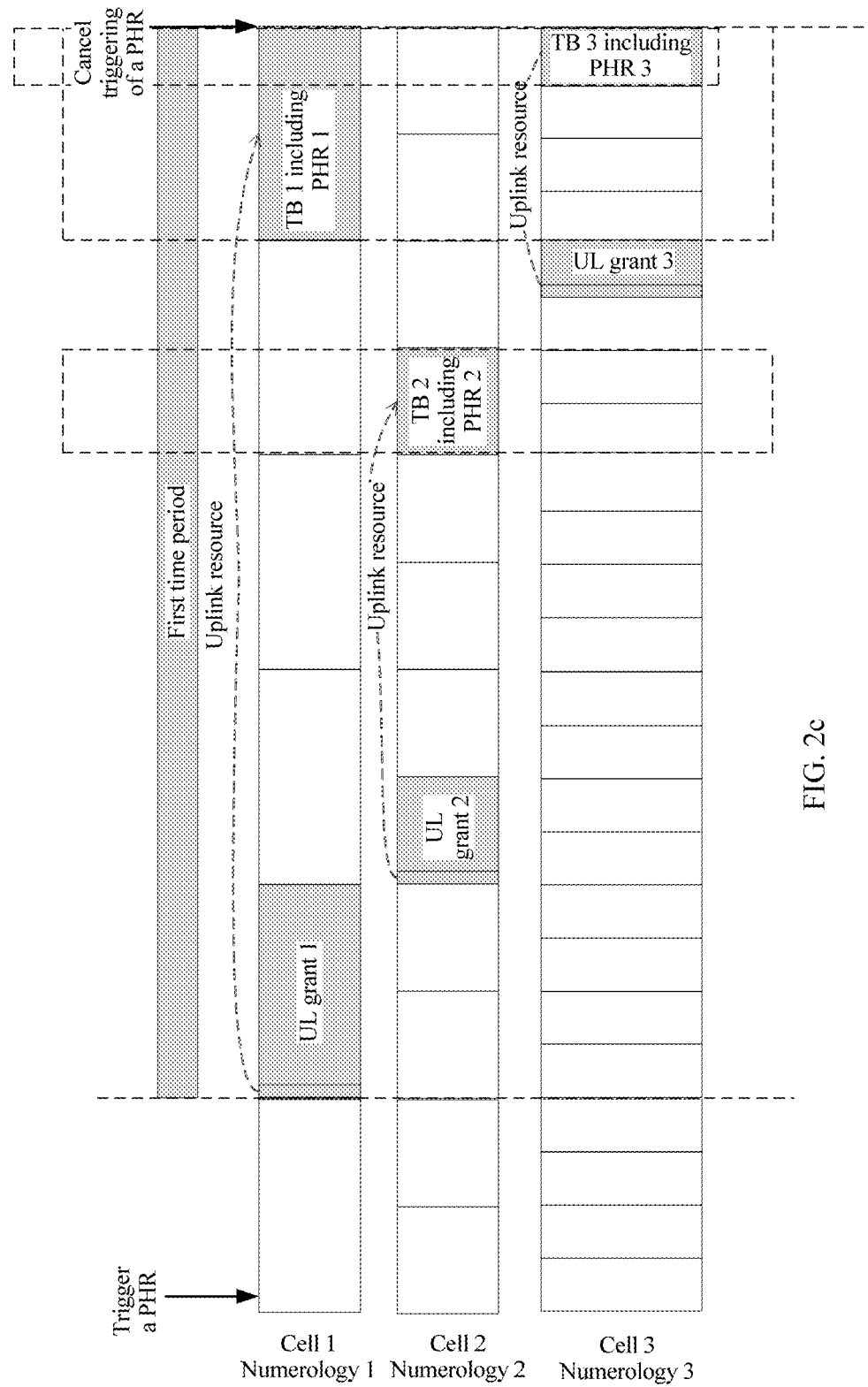
FIG. 2c is a schematic diagram of a time sequence for triggering and generating PHRs in a multi-cell and multi-numerology scenario.

As shown in FIG. 2c, different numerologies are separately configured for a cell 1, a cell 2, and a cell 3. The cell 1 uses a numerology 1, the cell 2 uses a numerology 2, the cell 3 uses a numerology 3, a UL grant 1 is delivered by using the numerology 1 of the cell 1, a UL grant 2 is delivered by using the numerology 2 of the cell 2, and a UL grant 3 is delivered by using the numerology 3 of the cell 3. TTIs of the numerologies 1, 2 and 3 are all different. The numerology 1 has the longest TTI, and the numerology 3 has the shortest TTI. A time domain resource of uplink transmission scheduled by the UL grant 3 overlaps a time domain resource of uplink transmission scheduled by the UL grant 1. A sequence in which the UE receives these UL grants is the UL grant 1, the UL grant 2, and the UL grant 3. All these UL grants indicate new transmission.

The UE receives the UL grant 1 sent by the base station, and determines the first time period. Because an uplink resource allocated by the UL grant 1/2/3 falls within the first time period, the terminal device may generate three PHR MAC CEs, in other words, one PHR MAC CE is generated for each UL grant, and the three PHR MAC CEs are sent to the base station.

3. Generation of a PHR in a Multi-Numerology and/or Multi-Beam Scenario

When there is only one type of numerology in the prior art, PHs included in a PHR are PH values of all activated serving cells on an uplink transmission time domain resource scheduled by a UL grant corresponding to the PHR, and when a plurality of numerologies and/or a plurality of beams are configured for one cell, it is an urgent problem to determine PHs included in the PHR and a basis of PH calculation.

In addition, when there is only one type of numerology, there is no case in which uplink transmission time domain resources scheduled by different UL grants overlap (including partial overlapping). Because of existence of a plurality of numerologies, uplink transmission time domain resources scheduled by different UL grants may overlap (including partial overlapping). Therefore, during generation of a PHR, when PHs of all numerologies of all cells are calculated, if only an uplink data channel and/or a control channel of the PHR on an uplink transmission time domain time resource scheduled by the PHR for the UL grant are/is considered for each cell or numerology, a PH received by the base station may be inaccurate.

Figure 3A:
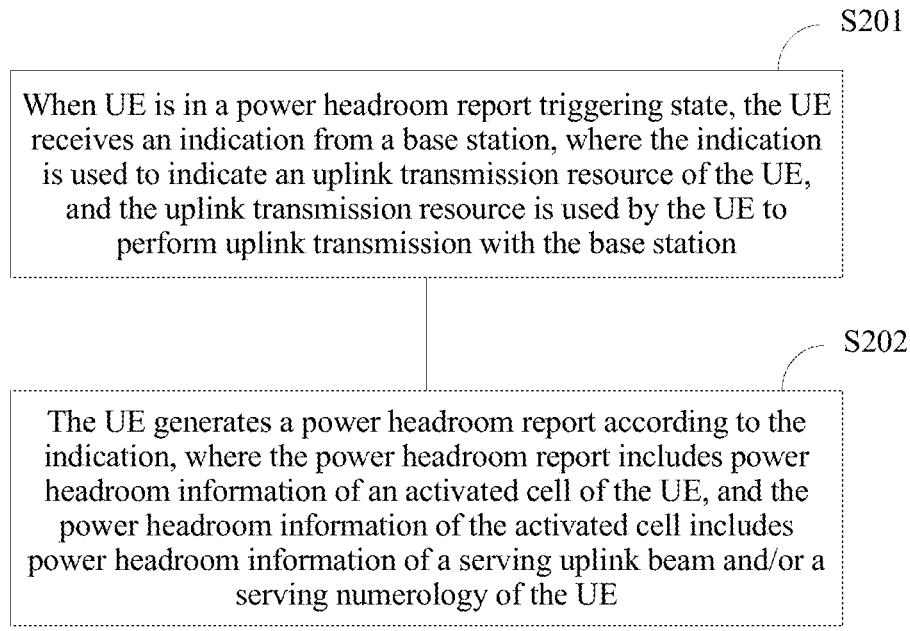
FIG. 3a is a schematic flowchart of an information transmission method according to an embodiment of the present invention.

In view of this, as shown in FIG. 3a, an embodiment of the present invention provides an information transmission method, and the method includes the following operations:

S201. When UE is a power headroom report triggering state, the UE receives an indication from a base station, where the indication is used to indicate an uplink transmission resource of the UE, and the uplink transmission resource is used by the UE to perform uplink transmission with the base station.

S202. The UE generates a power headroom report according to the indication, where the power headroom report includes power headroom information of an activated serving cell of the UE, and the power headroom information of the activated serving cell includes power headroom information of a serving uplink beam and/or a serving parameter set of the UE.

In one embodiment, calculation of the power headroom information of the serving uplink beam and/or the serving parameter set is based on power of an uplink data channel and/or an uplink control channel on a time domain resource occupied by the power headroom report when the power headroom report is generated.

In one embodiment, the power headroom report includes a cell index.

In one embodiment, the power headroom report includes an uplink beam identifier and/or a parameter set identifier.

In one embodiment, the method further includes: sending, by the UE, the power headroom report on the uplink transmission resource.

The power headroom report triggering state is a state in which the UE is allowed to generate a power headroom report.

The serving uplink beam is an uplink beam that can be used for data transmission between the base station and the UE, and may be further understood as an uplink beam that can provide a radio resource for the UE, and is usually configured by the base station. The serving uplink beam may also be referred to as an activated uplink beam. For example, if the UE supports five uplink beams, and the base station configures two uplink beams for data transmission between the base station and the UE, the two uplink beams are uplink beams used for data transmission between the base station and the UE.

The serving parameter set is a parameter set that can be used for data transmission between the base station and the UE, and may be further understood as a parameter set that can provide a radio resource for the UE, and may be usually configured by the base station. The serving parameter set may also be referred to as an activated parameter set. For example, if the UE supports three parameter sets, and the base station configures two parameter sets for data transmission between the base station and the UE, the two parameter sets are parameter sets used for data transmission between the base station and the UE.

For Example:

The UE may generate a first MAC CE based on the first indication and the UE being in the PHR triggering state. The first indication indicates a location of a time-frequency resource, and the time domain resource is located in a first cell. When the terminal device generates or constructs a MAC PDU according to the first indication, for example, a logical channel priority (LCP), if it is determined that a time unit of a time resource indicated by the first indication corresponds to another activated serving cell or servicing numerology or servicing beam, and there is uplink data (such as, an uplink data channel and/or an uplink control channel) transmission, a real type-1 PH or type-2 PH is reported for the another activated serving cell or serving numerology or serving beam, and specifically, a physical layer of the UE calculates the real PH, and submits the real PH to a MAC layer of the UE, so that the MAC layer of the UE generates or constructs a first MAC CE in a timely manner; and if it is determined that the time unit of the time domain resource indicated by the first indication corresponds to another activated serving cell or serving numerology, and there is no uplink data channel transmission or uplink control channel transmission, a virtual type-1 PH or type-2 PH is reported for the another activated serving cell or servicing numerology or serving beam, and specifically, the physical layer of the UE calculates the virtual PH and submits the virtual PH to the MAC layer of the UE, so that the MAC layer of the UE generates or constructs a first MAC CE in a timely manner.

For example, when the UE is in the PHR triggering state, the UE receives at least one UL grant, and an uplink time domain resource location indicated by the at least one first indication is located in the first time period. The at least one first indication may be received at different time points. In this case, the UE may sequentially process the UL grants in a time sequence, to generate a corresponding PHR. A calculation principle for a PH in each PHR may be described above.

For example, a scenario corresponding to FIG. 2c is used as an example for description.

A TTI length corresponding to a first air interface (numerology) is a first TTI, a TTI length corresponding to a second air interface is a second TTI, and a TTI length corresponding to a third air interface is a third TTI. A length sequence of the TTI lengths is as follows: the first TTI>the second TTI>the third TTI.

A receiving time sequence of the UL grants is: the UL grant 1, the UL grant 2, and the UL grant 3, and a sequence of processing the UL grants by the UE is also the UL grant 1, the UL grant 2, and the UL grant 3. When processing the UL grant 1, the UE does not know that the UL grant 3 is to be received later, where a time domain resource in an uplink transmission resource indicated by the UL grant 1 and a time domain resource in an uplink transmission resource indicated by the UL grant 3 have an overlapping area. In this case, when the UE generates a PHR MAC CE based on the UL grant 1, a PH of the cell 1 or the numerology 1 is a real PH, a PH of the cell 3 or the numerology 3 is a virtual PH, and a PH of the cell 2 or the numerology 2 is a virtual PH because the cell 2 or the numerology 2 has no uplink transmission in a time domain location of the uplink transmission resource indicated by the UL grant 1. When processing the UL grant 2, the UE has not received the UL grant 3, and therefore, before the UE generates a PHR MAC CE based on the UL grant 2, the UE leans, through calculation, that the PHs of the cell 1 and the cell 3 or the numerology 1 and the numerology 3 are virtual PHs, and learns, through calculation, that the PH of the cell 2 or the numerology 2 is a real PH. When the UE processes the UL grant 3, because the UE has known in advance that the uplink transmission time domain resource of the UL grant 3 and the uplink transmission time domain resource domain of the UL grant 1 overlap, the UE generates a PHR MAC CE based on the UL grant 3, and learns, through calculation, that the PHs of the cell 1 and the cell 3 or the numerology 1 and the numerology 3 are real PHs, and the UE learns, through calculation, that the PH of the cell 2 or the numerology 2 is a virtual PH because there is no scheduling on the cell 2 in this case.

In addition, when there are a plurality of serving numerologies and/or a plurality of serving beams for a cell, a PH included in a PHR cannot effectively correspond to a numerology and/or a beam on a base station side. This is not unfavorable for the base station side to learn a PH of each numerology and/or beam.

In view of this, in a possible embodiment, the base station may configure a beam identifier such as a beam index and a cell identifier such as a cell index for the UE in advance, to associate the beam index with a specific UL beam, or a UL beam and a DL beam, or a UL beam, and to associate the cell index with a specific cell. In this case, when reporting the PH, the UE may carry the corresponding beam index and cell index, and then the base station may learn, by using the beam index and the cell index, a PH of a specific beam of a specific cell that a PH in the PHR is.

Alternatively, when the UE generates or constructs a PHR MAC CE based on the first indication sent by the base station and the UE being in the PHR triggering state, and when the UE reports the PHR MAC CE, the UE needs to calculate and report a type-1 and/or type-2 PH of at least one activated UL beam of an activated serving cell of the UE, and carries a beam index or a TRP index corresponding to the UL beam. A TRP is a type of base station. In one embodiment, for example, in a high-frequency cell, one cell may include at least one TRP, and the UE may perform data communication with the at least one TRP. The at least one activated UL beam may be configured by the base station. In one embodiment, the UE may determine the UL beam based on a DL beam, for example, determine the UL beam based on a DL beam with better measurement signal strength. In this way, the UE sends the PHR MAC CE to the base station, and the PHR MAC CE may include information about the beam or the TRP to which the PH belongs.

In this way, beam-specific power control can be supported. When the UE can transmit data by using a plurality of beams of a cell, PHs of all serving beams of all activated serving cells may be reported by using a PHR. In this way, the base station may learn a downlink beam whose path loss decreases.

Similarly, in a possible embodiment, the base station may configure a numerology identifier such as a numerology index and a cell identifier such as a cell index for the UE in advance, to associate the numerology index with a specific numerology, and to associate the cell index with a specific cell. In this case, when reporting the PH, the UE may carry the corresponding numerology index and cell index, and then the base station may learn, by using the numerology index and the cell index, a PH in a specific numerology of a specific cell that a PH in the PHR is.

In one embodiment, after generating a PHR corresponding to a numerology, such as a first numerology, the UE may cancel the PHR triggering state that a numerology whose TTI length is less than that of the first numerology triggers the UE to enter.

In one embodiment, the foregoing association between a numerology identifier such as a numerology ID or index and a numerology, and/or the association between a beam identifier such as a beam index and a beam, and/or the association between a TRP identifier and a TRP may be configured by the base station, or may be determined by the UE according to a rule that is specified in a protocol and that is consistent with the base station.

In one embodiment, when the UE generates a PHR MAC CE based on the first indication sent by the base station and the UE being in the PHR triggering state, and when the UE reports the PHR MAC CE, the UE needs to calculate and report a type-1 and/or type-2 PH of at least one activated numerology of an activated serving cell of the UE, and carries a numerology index corresponding to the numerology. In this way, the UE sends the PHR MAC CE to the base station, and the PHR MAC CE may include information about the numerology to which the PH belongs.

In one embodiment, the base station may learn, in another manner, numerology information and/or beam information of the PH included in the PHR. For example, PHs of different numerologies and/or beams are reported according to a rule known by both the base station and the UE, for example, a specific time sequence or a specific resource occupation rule. Details are not described herein.

4. Reporting Condition of a PHR and/or a BSR

In terms of PHR reporting, in one embodiment, when UE is in a PHR triggering state, UL grants of both a serving numerology and a serving beam (if any) of an activated serving cell may trigger generation of a PHR.

In this way, a base station may receive a relatively large amount of PHR information, and PHR overheads are relatively large. A similar problem also exists in BSR reporting.

Figure 3B:
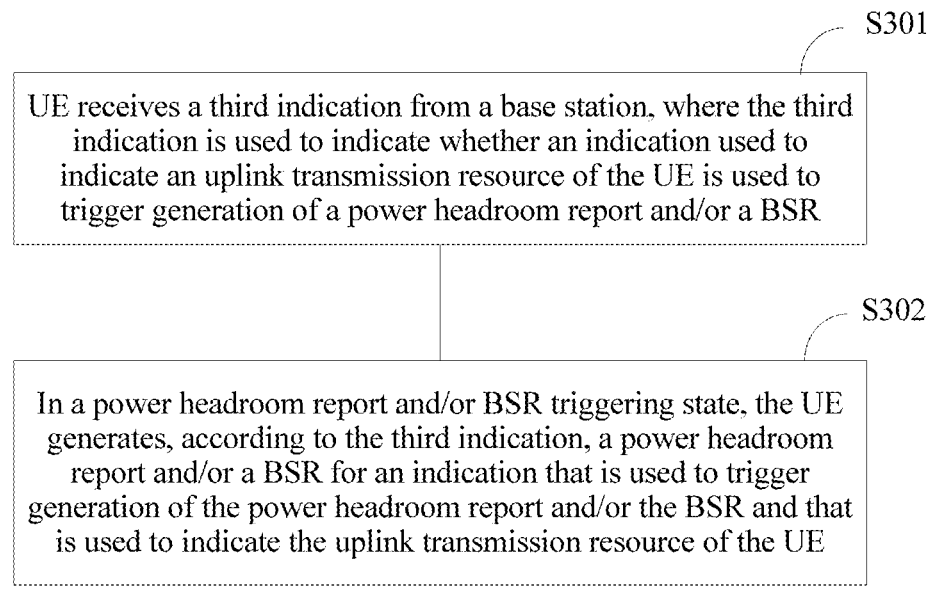
FIG. 3b is a schematic flowchart of an information transmission method according to an embodiment of the present invention.

In view of this, as shown in FIG. 3b, for a PHR, an embodiment of the present invention provides an information transmission method, and the method includes the following operations:

S301. UE receives a third indication from a base station, where the third indication is used to indicate whether an indication used to indicate an uplink transmission resource of the UE is used to trigger generation of a power headroom report.

S302. In a power headroom report triggering state, the UE generates, according to the third indication, a power headroom report for an indication that is used to trigger generation of the power headroom report and that is used to indicate the uplink transmission resource of the UE.

For a BSR, an embodiment of the present invention provides an information transmission method, and the method includes the following operations:

S301'. UE receives a fourth indication from a base station, where the fourth indication is used to indicate whether an indication used to indicate an uplink transmission resource of the UE is used to trigger generation of a BSR.

S302'. In a BSR triggering state, the UE generates, according to the fourth indication, a BSR for an indication that is used to trigger generation of the BSR and that is used to indicate the uplink transmission resource of the UE.

In one embodiment, it may be considered by default that the indication used to indicate the uplink transmission resource of the UE may be used to trigger generation of the power headroom report and/or the buffer status report, the third indication may be used to indicate that an indication used to indicate the uplink transmission resource of the UE is not used to trigger generation of the power headroom report, and the fourth indication may be used to indicate that an indication used to indicate the uplink transmission resource of the UE is not used to trigger generation of the buffer status report.

In one embodiment, it may be considered by default that the indication used to indicate the uplink transmission resource of the UE may not be used to trigger generation of the power headroom report and/or the buffer status report, the third indication may be used to indicate that an indication used to indicate the uplink transmission resource of the UE is used to trigger generation of the power headroom report, and the fourth indication may be used to indicate that an indication used to indicate the uplink transmission resource of the UE is used to trigger generation of the buffer status report.

In one embodiment, the third indication may be used to indicate that an indication used to indicate the uplink transmission resource of the UE is used to trigger generation of the power headroom report, and that an indication is not used to trigger generation of the power headroom report. Similarly, the fourth indication may be used to indicate that an indication used to indicate the uplink transmission resource of the UE is used to trigger generation of the buffer status report, and that an indication is not used to trigger generation of the buffer status report.

For Example:

The UE receives a first indication sent by the base station. The first indication is used to indicate the uplink transmission resource, and the uplink transmission resource is located in a first numerology or a first serving cell. For example, the first indication may be DCI or a UL grant, and may be scrambled by using a cell temporary identifier C-RNTI and sent by using a downlink control channel. The first indication may be transmitted by using the first numerology, or may be transmitted by using the first serving cell. The numerology may be understood as a parameter set of at least one of a subcarrier spacing, a cyclic prefix CP length, and a TTI length. For example, the subcarrier spacing is 15 kHz×2n, where n is an integer. One serving cell may support at least one numerology.

The UE receives first information sent by the base station, and the first information is used to indicate whether the UE can report a PHR. In one embodiment, the first information may be carried in a reserved field of the first indication, and the UE may obtain the first information by reading the reserved field of the first indication. The reserved field is specified in a protocol. In one embodiment, the first information indicates whether the UL grant received by the UE is used to trigger reporting of the PHR. For example, only a UL grant of a specific serving cell, a specific numerology, or a specific beam is used to trigger reporting of the PHR. In one embodiment, the first information may not be included in the first indication, for example, is sent in a dynamic manner such as DCI or in a semi-static manner.

If the first information indicates that the UE is allowed to report the PHR, the UE generates a first PHR MAC CE based on the first indication, the first information (the first indication may include the first information), and the UE being in the PHR triggering state.

If the first information indicates that the UE is not allowed to report the PHR, the UE generates first data based on the first indication and the first information, and the first data does not include a PHR MAC CE. It may be further understood that no PHR MAC CE is generated when the first data is generated.

The first indication may further include one or more of the following: a time-frequency resource of the first PHR MAC CE, a modulation and coding scheme of the first PHR MAC CE, a HARQ process (optional) of the first PHR MAC CE, an indication of whether the first PHR MAC CE is newly transmitted or retransmitted, a redundancy version of the first PHR MAC CE, and the like.

The UE sends the first PHR MAC CE or the first data to the base station based on a time-frequency resource of the first indication.

In one embodiment, the UE may start or restart a periodic timer and/or a prohibit timer in a corresponding time unit for sending the first PHR MAC CE. The periodic timer is used to periodically trigger a PHR, and the prohibit timer is used to control triggering of a PHR, for example, prevent continuous triggering of a PHR.

In one embodiment, if the UE sends the first data to the base station, the UE does not cancel the PHR triggering state.

In one embodiment, if the UE sends the PHR MAC CE to the base station, the UE may cancel the PHR triggering state.

For example, FIG. 2c is still used as an example.

The base station indicates, in a UL grant 1 and a UL grant 2, that the UE is not allowed to report the PHR. Therefore, neither a generated TB 1 nor a generated TB 2 includes the PHR MAC CE. The base station indicates, in a UL grant 3, that the terminal device is allowed to report the PHR. In this case, when a TB 3 is generated, the PHR MAC CE needs to be included, and the PHR MAC CE needs to be sent to the base station.

It may be understood that, in another possible embodiment, a specific serving cell or numerology or beam for which a PHR is reported may be determined by the UE according to a rule consistent with the base station without an indication from the base station. For example, generation of the PHR is triggered only after a UL grant of a shortest TTI in configured TTI lengths is received, or generation of the PHR is triggered only after a UL grant of a numerology and/or a beam whose channel quality is less than a specific threshold is received. Details are not described herein.

In this way, PHR and/or BSR overheads can be reduced.

Figure 4A:
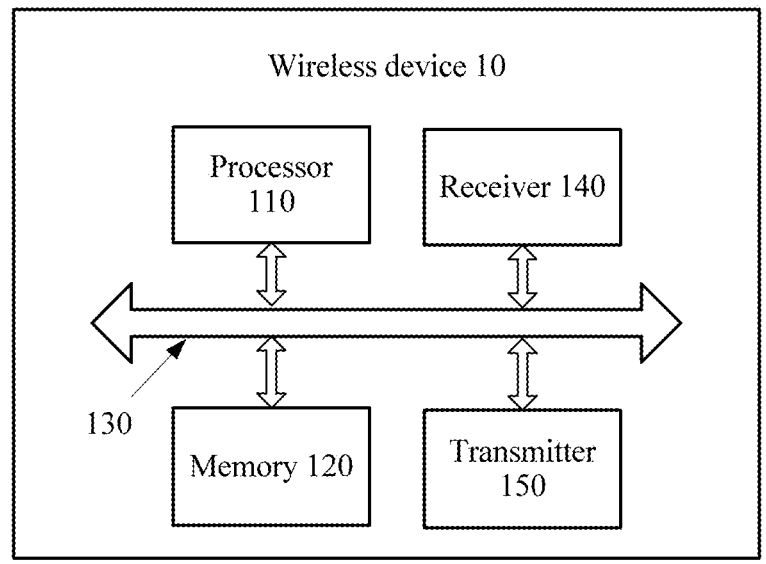
FIG. 4a is a schematic diagram of an information transmission apparatus (for example, user equipment) according to an embodiment of the present invention.

Based on the foregoing method, as shown in FIG. 4a, an embodiment of the present invention further provides an information transmission apparatus. The apparatus may be a wireless device 10 or a chip that can be disposed in the wireless device 10. The wireless device 10 may correspond to the user equipment in the foregoing method.

The apparatus may include a processor 110 and a memory 120. Further, the apparatus may further include a receiver 140 and a transmitter 150. Further, the apparatus may further include a bus system 130. The processor 110, the memory 120, the receiver 140, and the transmitter 150 may be connected to each other by using the bus system 130.

The memory 120 is configured to store an instruction, and the processor 110 is configured to execute the instruction stored in the memory 120, to control the receiver 140 to receive a signal and control the transmitter 150 to send a signal, so as to complete the operations of the user equipment in the foregoing method. The receiver 140 and the transmitter 150 may be a same physical entity or different physical entities. When the receiver 140 and the transmitter 150 are a same physical entity, the receiver 140 and the transmitter 150 may be collectively referred to as a transceiver. The memory 220 may be integrated into the processor 210, or may be separated from the processor 210.

In one embodiment, it may be considered that functions of the receiver 140 and the transmitter 150 are implemented by using a transceiver circuit or a dedicated transceiver chip. It may be considered that the processor 110 is implemented by using a dedicated processing chip, a processing circuit, a processor, or a general-purpose chip.

In another embodiment, it may be considered that the wireless device provided in this embodiment of the present invention is implemented by using a general-purpose computer. To be specific, program code for implementing functions of the processor 110, the receiver 140, and the transmitter 150 are stored in the memory, and a general-purpose processor implements the functions of the processor 110, the receiver 140, and the transmitter 150 by executing the code in the memory.

For concepts, explanations, detailed descriptions, and other operations that are involved in the apparatus and related to the technical solution provided in this embodiment of the present invention, refer to descriptions about the content in the foregoing method or in another embodiment. Details are not described herein again.

Figure 4B:
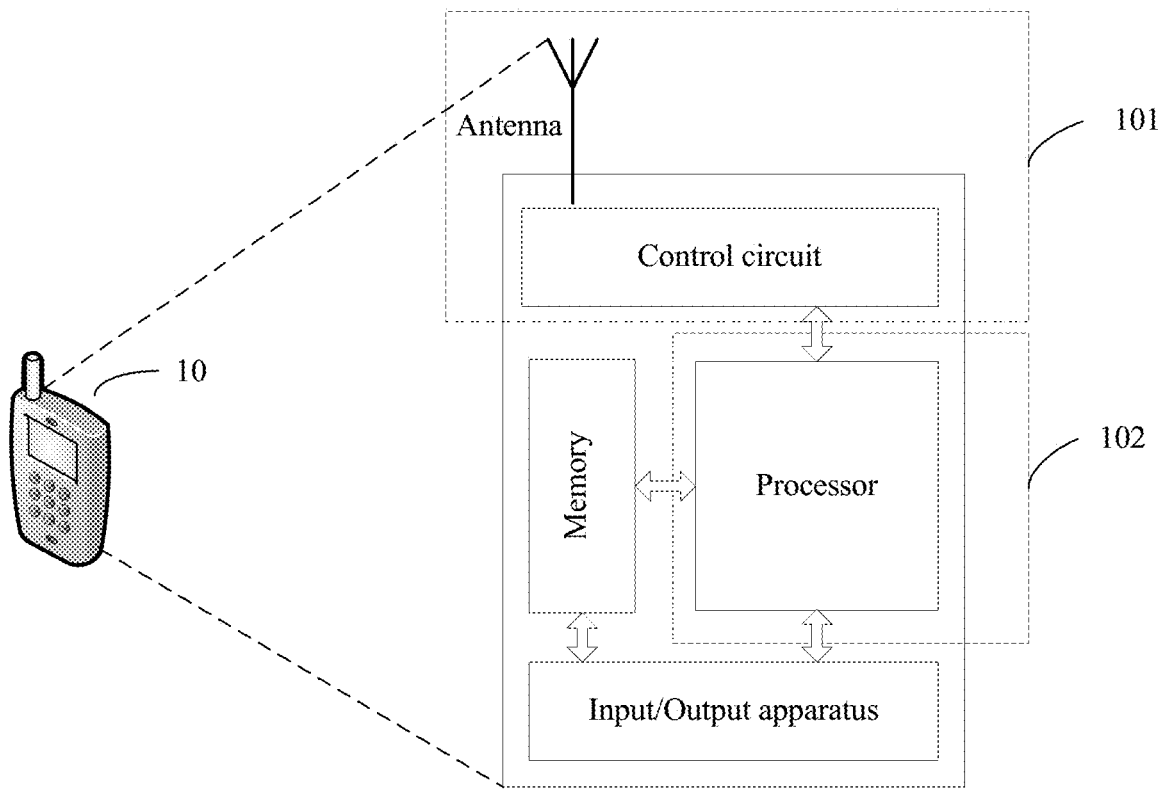
FIG. 4b is a schematic structural diagram of user equipment according to an embodiment of the present invention.

FIG. 4b is a schematic structural diagram of a terminal device, such as user equipment UE. The UE is applicable to the system shown in FIG. 6 and/or the scenarios shown in FIG. 1a and FIG. 1b. For ease of description, FIG. 4b shows only main components of the user equipment. As shown in FIG. 4b, user equipment 100 includes a processor, a memory, a control circuit, an antenna, and an input/output apparatus. The processor is mainly configured to: process a communications protocol and communication data, control the entire user equipment, execute a software program, and process data of the software program, for example, support the UE in executing the actions described in at least one of FIG. 2b, FIG. 3a, and FIG. 3b. The memory is mainly configured to store a software program and data, for example, store a codebook described in the foregoing embodiment. The control circuit is mainly used for conversion between a baseband signal and a radio frequency signal and processing of the radio frequency signal. The control circuit and the antenna may also be referred to as a transceiver together, and are mainly configured to receive and transmit a radio frequency signal in a form of an electromagnetic wave. The input/output apparatus, for example, a touchscreen, a display, or a keyboard, is mainly configured to receive data input by a user and output data to the user.

After the user equipment is powered on, the processor may read a software program in a storage unit, interpret and execute an instruction of the software program, and process data of the software program. When data needs to be sent in a wireless manner, the processor performs baseband processing on the to-be-sent data, and then outputs a baseband signal to a radio frequency circuit. After performing radio frequency processing on the baseband signal, the radio frequency circuit sends the radio frequency signal by using the antenna in a form of an electromagnetic wave. When data is sent to the user equipment, the radio frequency circuit receives a radio frequency signal by using the antenna, converts the radio frequency signal into a baseband signal, and outputs the baseband signal to the processor, and the processor converts the baseband signal into data and processes the data.

A person skilled in the art may understand that, for ease of description, FIG. 4b shows only one memory and one processor. In one embodiment, there may be a plurality of processors and a plurality of memories. The memory may also be referred to as a storage medium, a storage device, or the like. This is not limited in this embodiment of the present invention.

In one embodiment, the processor may include a baseband processor and a central processing unit. The baseband processor is mainly configured to process a communications protocol and communication data. The central processing unit is mainly configured to: control the entire user equipment, execute a software program, and process data of the software program. The processor in FIG. 4b is integrated with functions of the baseband processor and the central processing unit. A person skilled in the art may understand that the baseband processor and the central processing unit may be alternatively independent processors, and are interconnected by using a technology such as a bus. A person skilled in the art may understand that the user equipment may include a plurality of baseband processors to adapt to different network standards, the user equipment may include a plurality of central processing units to enhance a processing capability of the user equipment, and components of the user equipment may be connected by using various buses. The baseband processor may be alternatively described as a baseband processing circuit or a baseband processing chip. The central processing unit may be alternatively described as a central processing circuit or a central processing chip. A function of processing the communications protocol and the communication data may be built in the processor; or may be stored in a storage unit in a form of a software program, and the processor executes the software program to implement a baseband processing function.

For example, in this embodiment of the present invention, an antenna with a transmitting/receiving function and a control circuit may be considered as a transceiver unit 101 of UE 10, and a processor with a processing function is considered as a processing unit 102 of the UE 10. As shown in FIG. 4b, the UE 10 includes the transceiver unit 101 and the processing unit 102. The transceiver unit may also be referred to as a transceiver, a transceiver, a transceiver apparatus, or the like. In one embodiment, a component that is in the transceiver unit 101 and that is configured to implement a receiving function may be considered as a receiving unit, and a component that is in the transceiver unit 101 and that is configured to implement a sending function may be considered as a sending unit. In other words, the transceiver unit 101 includes the receiving unit and the sending unit. For example, the receiving unit may also be referred to as a receiver, a receiver, a receiver circuit, or the like, and the sending unit may be referred to as a transmitter, a transmitter, a transmitter circuit, or the like.

Figure 5A:
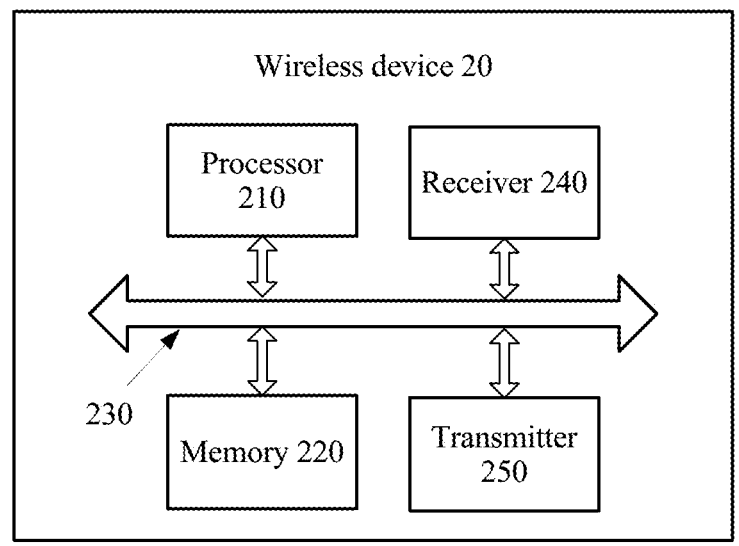
FIG. 5a is a schematic diagram of another information transmission apparatus (for example, a wireless network device) according to an embodiment of the present invention.

Based on the foregoing method, as shown in FIG. 5a, an embodiment of the present invention further provides another information transmission apparatus. The apparatus may be a wireless device 20 or a chip that can be disposed in the wireless device 20, and the wireless device 20 corresponds to a first wireless network device in the foregoing method. It may be understood that a second wireless device may be alternatively another device. This is not limited herein.

The apparatus may include a processor 210 and a memory 220. Further, the apparatus may further include a receiver 240 and a transmitter 250. Still further, the apparatus may further include a bus system 230.

The processor 210, the memory 220, the receiver 240, and the transmitter 250 are connected to each other by using the bus system 230. The memory 220 is configured to store an instruction. The processor 210 is configured to: execute the instruction stored in the memory 220, to control the receiver 240 to receive a signal and control the transmitter 250 to send a signal; and complete operations of the first wireless network device in the foregoing method. The receiver 240 and the transmitter 250 may be a same physical entity or different physical entities. When the receiver 240 and the transmitter 250 are a same physical entity, the receiver 240 and the transmitter 250 may be collectively referred to as a transceiver. The memory 220 may be integrated into the processor 210, or may be separated from the processor 210.

In one embodiment, it may be considered that functions of the receiver 240 and the transmitter 250 are implemented by using a transceiver circuit or a dedicated transceiver chip. It may be considered that the processor 210 is implemented by using a dedicated processing chip, a processing circuit, a processor, or a general-purpose chip.

In another embodiment, it may be considered that the wireless device provided in this embodiment of the present invention is implemented by using a general-purpose computer. To be specific, program code for implementing functions of the processor 210, the receiver 240, and the transmitter 250 are stored in the memory, and a general-purpose processor implements the functions of the processor 210, the receiver 240, and the transmitter 250 by executing the code in the memory.

For concepts, explanations, detailed descriptions, and other operations that are involved in the apparatus and related to the technical solution provided in this embodiment of the present invention, refer to descriptions about the content in the foregoing method or in another embodiment. Details are not described herein again.

Figure 5B:
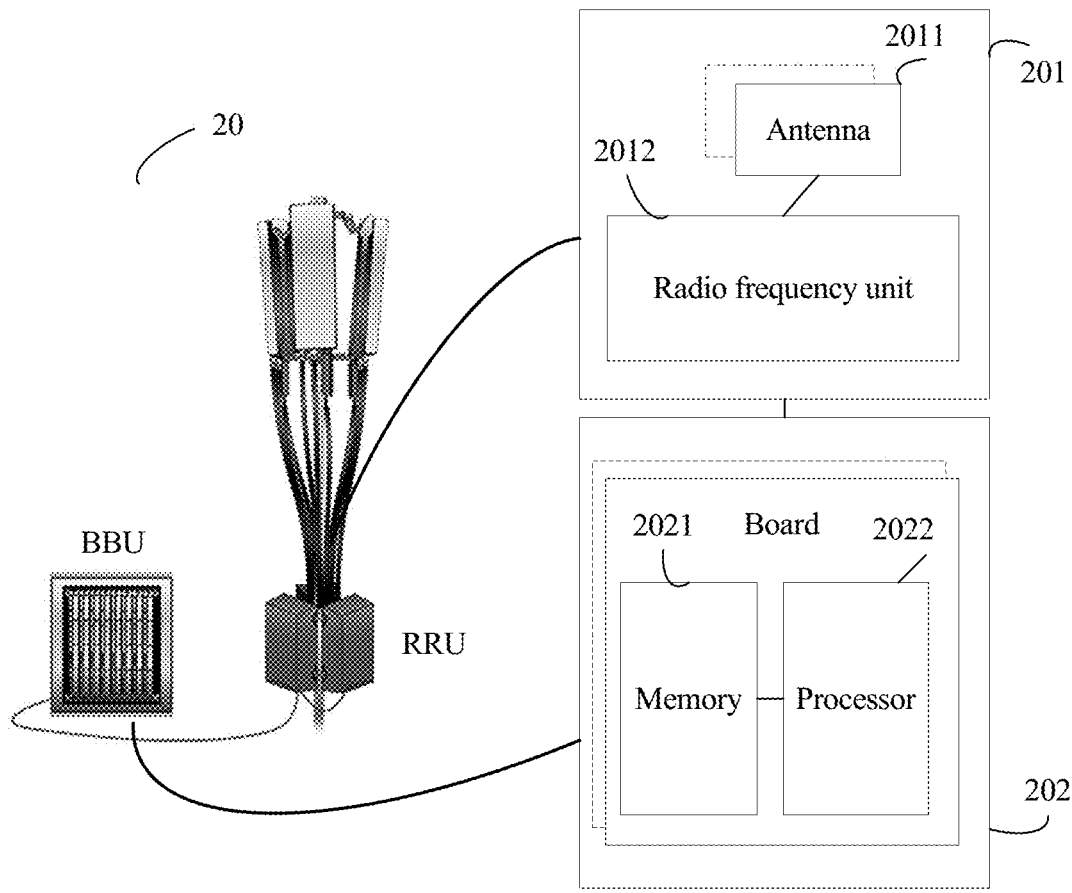
FIG. 5b is a schematic structural diagram of a wireless network device according to an embodiment of the present invention.

Based on the foregoing method, as shown in FIG. 5b, an embodiment of the present invention further provides a schematic structural diagram of a wireless network device, such as a base station.

Figure 1B:
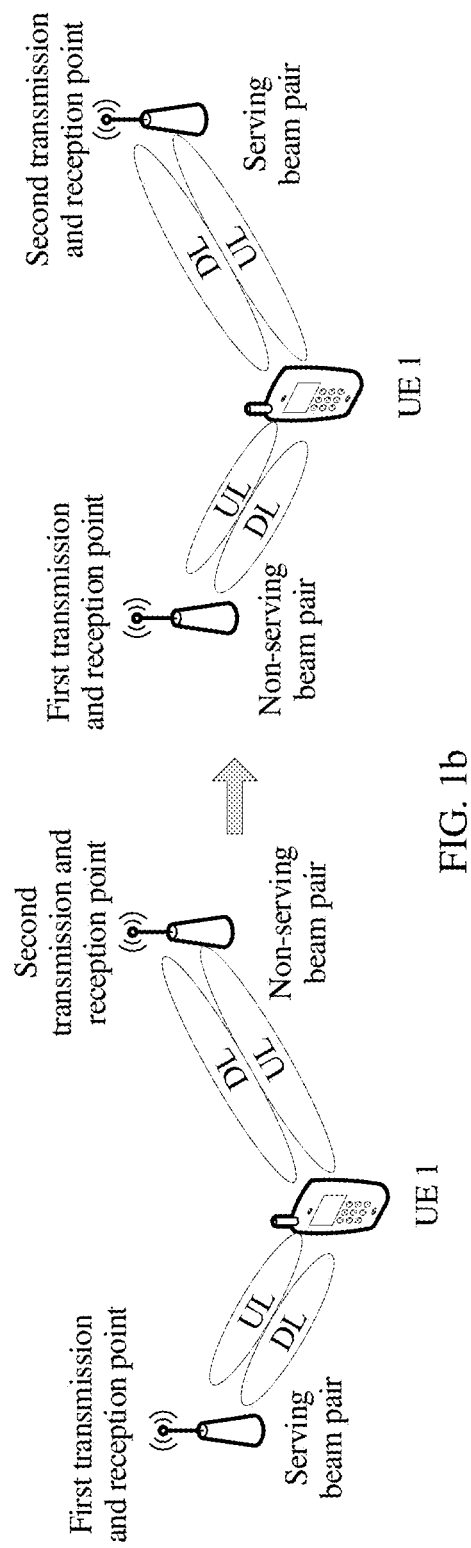
FIG. 1b is a schematic diagram of serving beam switching in a multi-beam scenario.

The base station is applicable to the system shown in FIG. 6 and/or the scenarios shown in FIG. 1a and FIG. 1b. A base station 20 includes one or more radio frequency units, such as a remote radio unit (RRU) 201 and one or more baseband units (BBU) (which may also be referred to as a digital unit, DU) 202. The RRU 201 may be referred to as a transceiver unit, a transceiver, a transceiver circuit, a transceiver, or the like, and may include at least one antenna 2011 and a radio frequency unit 2012. The RRU 201 is mainly configured to receive and transmit a radio frequency signal and convert a radio frequency signal and a baseband signal, for example, is configured to send the signaling indication and/or the reference signal in the foregoing embodiment to the user equipment. The BBU 202 is mainly configured to perform baseband processing, control the base station, and the like. The RRU 201 and the BBU 202 may be physically disposed together, or may be physically disposed separately, namely, a distributed base station.

The BBU 202 is a control center of the base station, may also be referred to as a processing unit, and is mainly configured to complete a baseband processing function, such as channel coding, multiplexing, modulation, or spectrum spreading. For example, the BBU (processing unit) may be configured to control the base station to perform a procedure shown in at least one of FIG. 2b, FIG. 3a, and FIG. 3b.

In an example, the BBU 202 may include one or more boards, and a plurality of boards may jointly support a radio access network (such as an LTE network) of a single access standard, or may separately support radio access networks of different access standards. The BBU 202 further includes a memory 2021 and a processor 2022. The memory 2021 is configured to store a necessary program instruction and necessary data. For example, the memory 2021 stores a correspondence between transmission latency difference information and a transmission latency difference in the foregoing embodiment. The processor 2022 is configured to control the base station to execute necessary actions, for example, is configured to control the base station to execute actions shown in at least one of FIG. 2b, FIG. 3a, and FIG. 3b. The memory 2021 and the processor 2022 may serve one or more boards. In other words, a memory and a processor may be separately disposed on each board, or a plurality of boards may share a same memory and a same processor. In addition, a necessary circuit may further be configured on each board.

Based on the method provided in this embodiment of the present invention, an embodiment of the present invention further provides a communications system, including the first wireless network device and one or more user equipments.

It should be understood that in this embodiment of the present invention, the processor may be a central processing unit (CPU), or the processor may be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general-purpose processor may be a microprocessor, or the processor may be any conventional processor or the like.

The memory may include a read-only memory and a random access memory, and provide an instruction and data to the processor. A part of the memory may further include a non-volatile random access memory.

The bus system may further include a power bus, a control bus, a status signal bus, and the like in addition to a data bus. However, for clear description, various types of buses in the figure are marked as the bus system.

In one embodiment, operations in the foregoing methods can be implemented by using a hardware integrated logical circuit in the processor, or by using instructions in a form of software. The operations of the method disclosed with reference to the embodiments of the present invention may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, a register, or the like. The storage medium is located in the memory, and the processor reads information in the memory and completes the operations in the foregoing methods in combination with hardware of the processor. To avoid repetition, details are not described herein again.

It should further be understood that "first", "second", "third", "fourth", and various numbers in this specification are merely used for differentiation for ease of description, and are not used to limit the scope of the embodiments of the present invention.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates that association objects are an "or" relationship, but may also indicate an "and/or" relationship. For details, refer to the foregoing and later descriptions for understanding.

In this application, "at least one" means one or more, and "a plurality of" means two or more. "At least one of the following items" or a similar expression means any combination of these items, including any combination of a single item or a plurality of items. For example, at least one of a, b, and c may represent a, b, c, a-b, a-c, b-c, or a-b-c, where a, b, and c may be a single one or a plurality of.

It should be understood that sequence numbers of the foregoing processes do not mean execution sequences in the embodiments of the present invention. The execution sequences of the processes should be determined based on functions and internal logic of the processes, and should not constitute any limitation on the implementation processes of the embodiments of the present invention.

A person of ordinary skill in the art may be aware that, in combination with illustrative logical blocks described in the embodiments disclosed in this specification and operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in one embodiment. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present invention are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive solid state disk (SSD)), or the like.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:
1. An information transmission method, comprising:
when a terminal device is in a power headroom report (PHR) triggering state, receiving a first indication from a network device, wherein the first indication is used to indicate a first uplink transmission resource of the terminal device, and the first uplink transmission resource is used by the terminal device to perform uplink transmission with the network device; and keeping the power headroom report triggering state in a first time period, and canceling the power headroom report triggering state when the first time period expires, wherein the first time period is:

a time period starting from a receiving time point of the first indication to a time point of generating a power headroom report based on a second indication corresponding to a shortest transmission time interval after the second indication is received, wherein the second indication is used to indicate a second uplink transmission resource of the terminal device.

2. The method according to claim 1, wherein the first indication is an indication that is first received by the terminal device after the terminal device enters the power headroom report triggering state and that corresponds to a relatively long transmission time interval and is used to indicate an uplink transmission resource of the terminal device.

3. The method according to claim 1, wherein the first uplink transmission resource has a first parameter set, and the first parameter set consists of a subcarrier spacing, a cyclic prefix length, and a transmission time interval; and/or the first uplink transmission resource comprises a first uplink beam set, and the first uplink beam set comprises at least one uplink beam.

4. The method according to claim 3, wherein the second uplink transmission resource has a second parameter set, and the second parameter set is different from the first parameter set in terms of at least one of three parameters comprised in the first and second parameter sets:

a subcarrier spacing, a cyclic prefix length, and a transmission time interval; and/or the second uplink transmission resource comprises a second uplink beam set that is different from the first uplink beam set.

5. The method according to claim 1, wherein the power headroom report triggering state is entered when a trigger condition is met, and the trigger condition comprises any one of the following:

(1) a first timer expires or has expired, and a path loss change value of a reference activated serving cell is greater than a first threshold, wherein the first threshold is a default value or is configured by a radio resource control (RRC) layer, and the first timer is configured to prevent the terminal device from continuously triggering a PHR;

(2) a second timer expires, wherein the second timer is configured to periodically trigger a PHR, duration of the second timer is a default value or is configured by an RRC layer, and the second timer is configured for a MAC entity;

(3) a PHR function configuration or reconfiguration from an upper layer is received, and the configuration or reconfiguration is not used to disable a PHR function;

(4) a secondary serving cell (SCell) with configured uplink transmission is activated;

(5) the first timer expires or has expired, transmit power back-off occurs in uplink transmission of an activated serving cell, and a power back-off value exceeds a second threshold;

(6) a primary serving cell (PSCell) of a secondary eNodeB with dual connectivity is added;

(7) the first timer expires or has expired, and a path loss change of at least one reference serving downlink beam (beam) of at least one serving cell exceeds a third threshold, wherein the third threshold is a default value or is configured by the network device;

(8) at least one serving uplink beam of at least one serving cell is activated, configured, or added;

(9) the first timer expires or has expired, power back-off occurs on at least one serving uplink beam used as a reference, and a back-off value exceeds a fourth threshold;

(10) a third timer expires, wherein the third timer is configured to periodically trigger a PHR, and is configured for a beam, and duration of the third timer is a default value or is configured by the network device;

(11) the first timer expires or has expired, and a path loss change of at least one numerology used as a reference exceeds a fifth threshold, wherein the fifth threshold is a default value or is configured by the network device;

(12) at least one numerology of at least one serving cell is activated, added, or configured;

(13) a fourth timer expires, wherein the fourth timer is configured to periodically trigger a PHR, and is configured for a numerology, and duration of the fourth timer is a default value or is configured by the network device; or

(14) the first timer expires or has expired, power back-off occurs on at least one numerology used as a reference, and a back-off value exceeds a sixth threshold, wherein the sixth threshold is a default value or is configured by the network device.

6. The method according to claim 1, further comprising:

generating a power headroom report for an indication, in the first time period, of an uplink transmission resource indicated in an indication used to indicate the uplink transmission resource of the terminal device, wherein the indication used to indicate the uplink transmission resource of the terminal device comprises the first indication.

7. The method according to claim 1, further comprising:

receiving a third indication from the network device, wherein the third indication is used to indicate whether an indication used to indicate an uplink transmission resource of the terminal device is used to trigger generation of a power headroom report, and an indication that is received by the terminal device and that is used to indicate the uplink transmission resource of the terminal device comprises the first indication; and in the power headroom report triggering state, generating, according to the third indication, the power headroom report for an indication that is used to trigger generation of the power headroom report and that is used to indicate the uplink transmission resource of the terminal device.

8. The method according to claim 7, further comprising:

sending the power headroom report on the uplink transmission resource.

9. The method according to claim 7, wherein the power headroom report comprises power headroom information of an activated serving cell of the terminal device, and the power headroom information of the activated serving cell comprises power headroom information of a serving uplink beam and/or a serving parameter set of the terminal device.

10. The method according to claim 9, wherein calculation of the power headroom information of the serving uplink beam and/or the serving parameter set is based on power of an uplink data channel and/or an uplink control channel on a time domain resource occupied by the power headroom report when the power headroom report is generated.

11. The method according to claim 9, wherein the power headroom report comprises an uplink beam identifier and/or a parameter set identifier.

12. An information transmission method, comprising:
determining whether a trigger condition is met; and
entering a power headroom report (PHR) triggering state when the trigger condition is met, wherein
the trigger condition comprises any one of the following:
(1) a first timer expires or has expired, and a path loss change of at least one reference serving downlink beam of a serving cell exceeds a third threshold, wherein the third threshold is a default value or is configured by a network device;
(2) at least one serving uplink beam of a serving cell is activated, configured, or added;
(3) the first timer expires or has expired, power back-off occurs on at least one serving uplink beam used as a reference, and a back-off value exceeds a fourth threshold;
(4) a third timer expires, wherein the third timer is configured to periodically trigger a PHR, and is configured for a beam, and duration of the third timer is a default value or is configured by the network device;
(5) the first timer expires or has expired, and a path loss change of at least one parameter set used as a reference exceeds a fifth threshold, wherein the fifth threshold is a default value or is configured by the network device, and the parameter set consists of a subcarrier spacing, a cyclic prefix length, and a transmission time interval;
(6) at least one numerology of a serving cell is activated, added, or configured;
(7) a fourth timer expires, wherein the fourth timer is configured to periodically trigger a PHR, and is configured for a numerology, and duration of the fourth timer is a default value or is configured by the network device; or
(8) the first timer expires or has expired, power back-off occurs on at least one numerology used as a reference, and a back-off value exceeds a sixth threshold, wherein the sixth threshold is a default value or is configured by the network device.

13. An apparatus, comprising a processor, wherein the processor is coupled to a memory; and
the processor is configured to execute a program or an instruction stored in the memory, and when the processor executes the instruction stored in the memory, the apparatus is configured to complete the method comprising:
when a terminal device is in a power headroom report (PHR) triggering state, receiving a first indication from a network device, wherein the first indication is used to indicate a first uplink transmission resource of the terminal device, and the first uplink transmission resource is used by the terminal device to perform uplink transmission with the network device; and
keeping the power headroom report triggering state in a first time period, and canceling the power headroom report triggering state when the first time period expires, wherein
the first time period is:
a time period starting from a receiving time point of the first indication to a time point of generating a power headroom report based on a second indication corresponding to a shortest transmission time interval after the second indication is received, wherein the second indication is used to indicate a second uplink transmission resource of the terminal device.

14. The apparatus according to claim 13, wherein the first indication is an indication that is first received by the terminal device after the terminal device enters the power headroom report triggering state and that corresponds to a relatively long transmission time interval and is used to indicate an uplink transmission resource of the terminal device.

15. The apparatus according to claim 13, wherein the first uplink transmission resource has a first parameter set (numerology), and the first parameter set consists of a subcarrier spacing, a cyclic prefix length, and a transmission time interval; and/or
the first uplink transmission resource comprises a first uplink beam set, and the first uplink beam set comprises at least one uplink beam.

16. The apparatus according to claim 15, wherein the second uplink transmission resource has a second parameter set that is different from the first parameter set in terms of at least one of three parameters comprised in the first and second parameter sets:
a subcarrier spacing, a cyclic prefix length, and a transmission time interval; and/or
the second uplink transmission resource comprises a second uplink beam set, and the second uplink beam set is different from the first uplink beam set.

17. The apparatus according to claim 13, wherein the power headroom report triggering state is entered when a trigger condition is met, and the trigger condition comprises any one of the following:
(1) a first timer expires or has expired, and a path loss change value of a reference activated serving cell is greater than a first threshold, wherein the first threshold is a default value or is configured by a radio resource control (RRC) layer, and the first timer is configured to prevent the terminal device from continuously triggering a PHR;
(2) a second timer expires, wherein the second timer is configured to periodically trigger a PHR, duration of the second timer is a default value or is configured by an RRC layer, and the second timer is configured for a MAC entity;
(3) a PHR function configuration or reconfiguration from an upper layer is received, and the configuration or reconfiguration is not used to disable a PHR function;
(4) a secondary serving cell (SCell) with configured uplink transmission is activated;
(5) the first timer expires or has expired, transmit power back-off occurs in uplink transmission of an activated serving cell, and a power back-off value exceeds a second threshold;
(6) a primary serving cell (PSCell) of a secondary eNodeB with dual connectivity is added;
(7) the first timer expires or has expired, and a path loss change of at least one reference serving downlink beam (beam) of at least one serving cell exceeds a third threshold, wherein the third threshold is a default value or is configured by the network device;
(8) at least one serving uplink beam of at least one serving cell is activated, configured, or added;
(9) the first timer expires or has expired, power back-off occurs on at least one serving uplink beam used as a reference, and a back-off value exceeds a fourth threshold;
(10) a third timer expires, wherein the third timer is configured to periodically trigger a PHR, and is configured for a beam, and duration of the third timer is a default value or is configured by the network device;

(11) the first timer expires or has expired, and a path loss change of at least one numerology used as a reference exceeds a fifth threshold, wherein the fifth threshold is a default value or is configured by the network device;

(12) at least one numerology of at least one serving cell is activated, added, or configured;

(13) a fourth timer expires, wherein the fourth timer is configured to periodically trigger a PHR, and is configured for a numerology, and duration of the fourth timer is a default value or is configured by the network device; or

(14) the first timer expires or has expired, power back-off occurs on at least one numerology used as a reference, and a back-off value exceeds a sixth threshold, wherein the sixth threshold is a default value or is configured by the network device.

18. The apparatus according to claim 13, wherein the apparatus is further configured to:

generate a power headroom report for an indication, in the first time period, of an uplink transmission resource indicated in an indication used to indicate the uplink transmission resource of the terminal device, wherein the indication used to indicate the uplink transmission resource of the terminal device comprises the first indication.

19. The apparatus according to claim 13, wherein the apparatus is further configured to:

receive a third indication from the network device, wherein the third indication is used to indicate whether an indication used to indicate an uplink transmission resource of the terminal device is used to trigger generation of a power headroom report, and an indication that is received by the terminal device and that is used to indicate the uplink transmission resource of the terminal device comprises the first indication; and in the power headroom report triggering state, generate, according to the third indication, the power headroom report for an indication that is used to trigger generation of the power headroom report and that is used to indicate the uplink transmission resource of the terminal device.

20. The apparatus according to claim 19, wherein the power headroom report comprises power headroom information of an activated serving cell of the terminal device, and the power headroom information of the activated serving cell comprises power headroom information of a serving uplink beam and/or a serving parameter set of the terminal device.

* * * * *